(12) United States Patent
Lin

(10) Patent No.: US 9,310,617 B2
(45) Date of Patent: Apr. 12, 2016

(54) DUAL-DIRECTIONAL 3D IMAGE DISPLAYING METHOD

(71) Applicant: ZHANGJIAGANG KANGDE XIN OPTRONICS MATERIAL CO., LTD., Suzhou (CN)

(72) Inventor: Ming-Yen Lin, Taipei (TW)

(73) Assignee: ZHANGJIAGANG KANGDE XIN OPTRONICS MATERIAL CO., LTD., Jiangsu Province (CN)

( * ) Notice: Subject to any disclaimer, the term of this patent is extended or adjusted under 35 U.S.C. 154(b) by 181 days.

(21) Appl. No.: 14/045,989

(22) Filed: Oct. 4, 2013

(65) Prior Publication Data

US 2014/0098418 A1    Apr. 10, 2014

(30) Foreign Application Priority Data

Oct. 5, 2012   (TW) .............................. 101136929 A

(51) Int. Cl.
*G02B 27/22*   (2006.01)

(52) U.S. Cl.
CPC .................................. *G02B 27/2214* (2013.01)

(58) Field of Classification Search
CPC .... G02B 27/2214; G02B 27/22; G02B 3/005; G02B 6/0068; H04N 13/0404; H04N 13/0422; H04N 13/0409; H04N 13/0402; H04N 13/0415; H04N 13/0413; H04N 13/047

USPC .......................... 359/462, 463, 464, 477, 466
See application file for complete search history.

(56) References Cited

U.S. PATENT DOCUMENTS

| 7,453,529 B2 | 11/2008 | Nam et al. |
| 2008/0231767 A1 | 9/2008 | Lee |
| 2011/0248994 A1 * | 10/2011 | Van Der Horst et al. ..... 345/419 |

FOREIGN PATENT DOCUMENTS

| TW | 201124769 | 7/2011 |
| TW | 201133032 | 10/2011 |
| TW | 201209448 | 3/2012 |
| TW | 201209450 | 3/2012 |
| TW | 101135830 | 9/2012 |
| TW | 201243393 | 11/2012 |

* cited by examiner

*Primary Examiner* — Jade R Chwasz
(74) *Attorney, Agent, or Firm* — WPAT, PC; Justin King

(57) ABSTRACT

A dual-directional 3D image displaying method, being used in a case when a flat-panel display screen and a view separation device are used for dual-directional 3D image displaying, which comprises the steps of: using a display screen having a sub-pixel arrangement of 45-degree slant angle to display a multi-view 3D combined image; and using a view separation device featured by a 45-degree slant angle to perform a view separation operation upon the multi-view 3D combined image. Thereby, an object of dual-directional displaying of 3D images can be achieved using only one view separation device, without being bothered by conventional problems, such as cross-talk and color distortion.

8 Claims, 36 Drawing Sheets

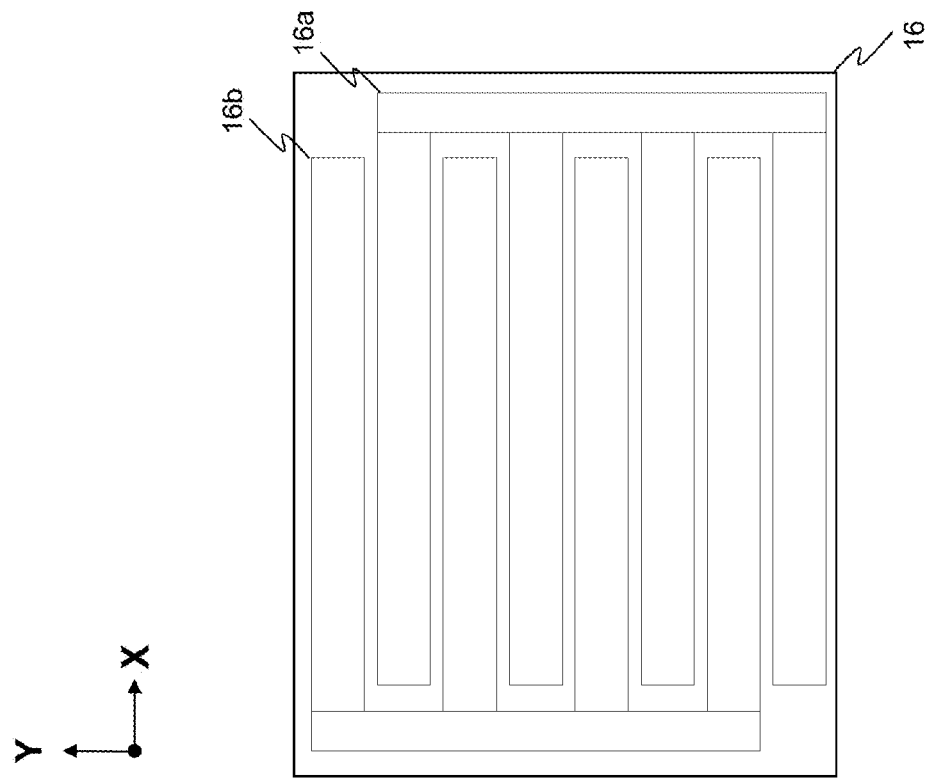
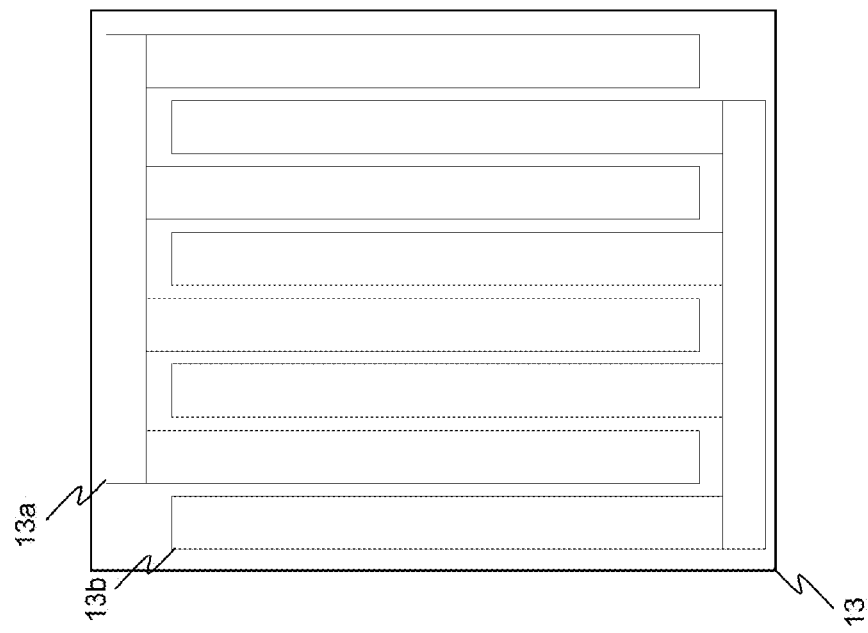
FIG. 4

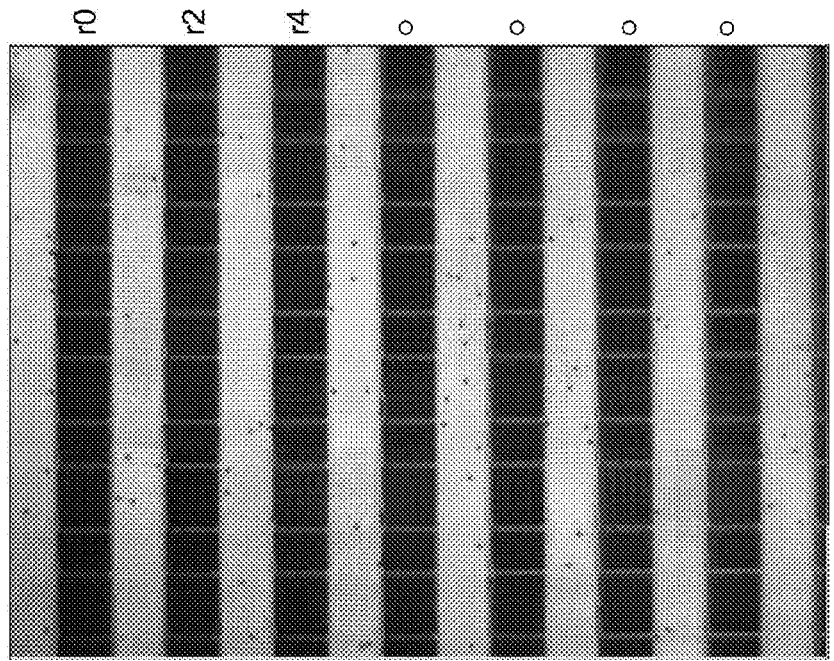
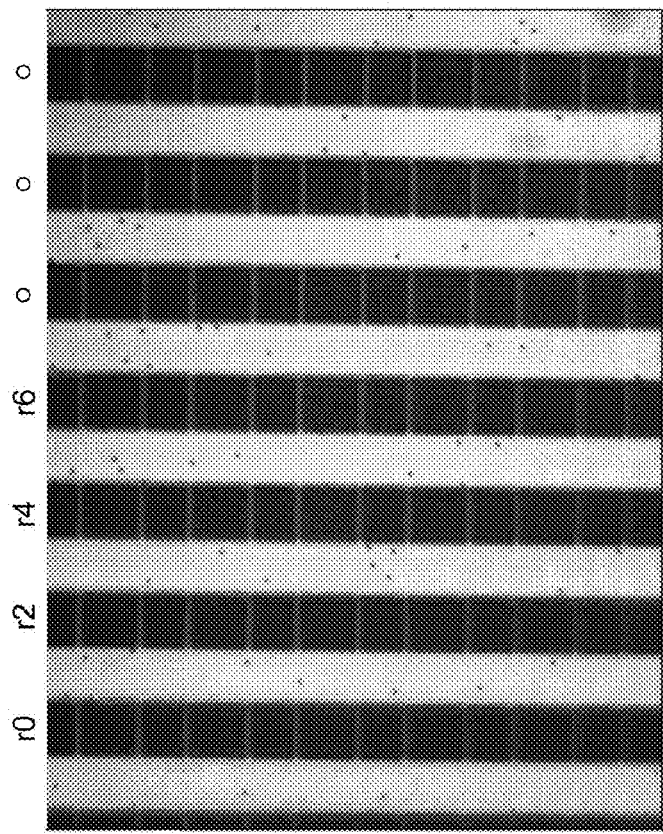
FIG. 17

| j\i | 0 | 1 | 2 | 3 | 4 | 5 | 6 | 7 | | | | |
|---|---|---|---|---|---|---|---|---|---|---|---|---|
| 0 | V(0,0) | V(0,1) | V(0,2) | V(0,3) | V(0,4) | V(0,5) | V(0,6) | V(0,7) | | | | |
| 1 | V(1,0) | V(1,1) | V(1,2) | V(1,3) | V(1,4) | V(1,5) | V(1,6) | V(1,7) | | | | |
| 2 | V(2,0) | V(2,1) | V(2,2) | V(2,3) | V(2,4) | V(2,5) | V(2,6) | V(2,7) | | | | |
| 3 | V(3,0) | V(3,1) | V(3,3) | V(3,3) | V(3,4) | V(3,5) | V(3,6) | V(3,7) | | | | |
| 4 | V(4,0) | V(4,1) | V(4,4) | V(4,4) | V(4,4) | V(4,5) | V(4,6) | V(4,7) | | | | |
| 5 | V(5,0) | V(5,1) | V(5,5) | V(5,5) | V(5,4) | V(5,5) | V(5,6) | V(5,7) | | | | |
| | | | | | | | | | | | | |
| | | | | | | | | | | | | |

| j\i | 0 | 1 | 2 | 3 | 4 | 5 | 6 | 7 | | | | |
|---|---|---|---|---|---|---|---|---|---|---|---|---|
| 0 | V(0,0) | V(0,1) | V(0,2) | V(0,3) | V(0,4) | V(0,5) | V(0,6) | V(0,7) | | | | |
| 1 | V(1,0) | V(1,1') | V(1,2') | V(1,3') | V(1,4') | V(1,5') | V(1,6') | V(1,7') | | | | |
| 2 | V(2,0) | V(2,1) | V(2,2) | V(2,3) | V(2,4) | V(2,5) | V(2,6) | V(2,7) | | | | |
| 3 | V(3,0) | V(3,1') | V(3,2') | V(3,3') | V(3,4') | V(3,5') | V(3,6') | V(3,7') | | | | |
| 4 | V(4,0) | V(4,1) | V(4,2) | V(4,3) | V(4,4) | V(4,5) | V(4,6) | V(4,7) | | | | |
| 5 | V(5,0') | V(5,1') | V(5,2') | V(5,3') | V(5,4') | V(5,5') | V(5,6') | V(5,7') | | | | |
| | | | | | | | | | | | | |
| | | | | | | | | | | | | |
| | | | | | | | | | | | | |
| | | | | | | | | | | | | |

DUAL-DIRECTIONAL 3D IMAGE DISPLAYING METHOD

FIELD OF THE INVENTION

The present invention relates to a dual-directional 3D image displaying method, being used in a case when a flat-panel display screen and a view separation device are used for dual-directional 3D image displaying, which comprises the steps of: using a display screen having a sub-pixel arrangement of 45-degree slant angle to display a multi-view 3D combined image; and using a view separation device featured by a 45-degree slant angle to perform a view separation operation upon the multi-view 3D combined image. Thereby, an object of dual-directional displaying of 3D images can be achieved using only one view separation device, without being bothered by conventional problems, such as cross-talk and color distortion.

BACKGROUND OF THE INVENTION

Among those conventional goggle-free 3D image displaying techniques capable of 2D/3D image switching and dual-directional displaying of 3D images, there are two that are similarly designed to achieve the above mentioned 3D functions basically by applying a vertical strip parallax barrier and a Liquid Crystal device, referring as LC device hereinafter, with double-layered ITO electrode layer upon a display screen having R, G, and B sub-pixels in a strip configuration, and one of which is a method disclosed in U.S. Pat. No. 7,453,529 B2 by Samsung Electronics Co., Ltd., referring as the Samsung Patent hereinafter, and the other is a method disclosed in U.S. Pub. No. 2008/0231767A1 by Masterimage 3D Inc., referring as the Masterimage Patent hereinafter. Generally, the 2D/3D image switching is achieved by transparentizing the LC device through the control of external driving voltage for enabling a 2D image displaying. In addition, the 3D image displaying in the Landscape and Portrait displaying mode of the display screen can also be performed by enabling the LC device to have different parallax barrier structures through the control of external driving voltage, and thereby, achieving the dual-directional displaying of 3D images. However, a wrong design of the electrode structure resulting a problem of light leakage in the shield elements of parallax barrier can generally cause severe cross-talk phenomenon, further, due to the design faults in parallax barrier, the 3D image displaying in Portrait mode can generally suffered by sever color distortion.

The following description relates to the construction of the aforesaid LC device as well as its functions and shortcomings Please refer to FIG. 1 and FIG. 2, which are schematic diagrams showing a display screen in a Landscape displaying mode and a Portrait displaying mode. As shown in FIG. 1 and FIG. 2, a Cartesian coordinate system of XYZ-axes is defined for a display screen in a manner that the long side of the display screen is arranged parallel to the X axis and the short side of the display screen is arranged parallel to the Y-axis, whereas such arrangement is fixed and will not change with the rotation of the display screen. Thereby, for a viewer watching the display screen, the Landscape displaying mode is that the long side of the display screen is arranged horizontally while the sort side thereof is arranged vertical to the viewer, and thus the RGD sub-pixels are vertically arranged for the viewer, and on the other hand, the Portrait displaying mode is that the long side of the display screen is arranged vertically while the sort side thereof is arranged horizontal to the viewer, and thus the RGD sub-pixels are horizontally arranged for the viewer. It is noted that for the display screen having the aforesaid RGB sub-pixel arrangement, it is generally referred as a display screen with strip configuration which is the mainstream product on the market. Other than that there are display screens of Delta configuration, Mosaic configuration, Pentile configuration, and so on.

Please refer to FIG. 3, which is a schematic diagram showing a parallax barrier used in the aforesaid Samsung Patent and Materimage Patent. It is noted that the LC devices used respectively in these two patents are structurally the same and using two ITO electrode layers to compose the structure of parallax barrier electrodes.

As shown in FIG. 3, the LC (Liquid Crystal) parallax barrier 10 used is about the same size as the display screen 1 and is orientated in the same way as the display screen 1. Moreover, such LC parallax barrier 10 is primarily composed of two linear polarizers 11, two transparent substrates 12, an upper electrode layer 13, a lower electrode layer 16, two alignment layers 14, a liquid crystal layer 15, in which the liquid crystal used in the liquid crystal layer 15 is a TN-type liquid crystal, the polarization directions of the two polarizers 11 are perpendicular to each other, and both the upper and the lower electrode layers 13, 16 are made of a transparent ITO conductive film with barrier electrodes of specially designed shapes. Thereby, when the external driving voltage V is zero, the LC parallax barrier 10 is transparentized for displaying 2D images.

Please refer to FIG. 4, which is a schematic diagram showing a barrier electrode disclosed in the Samsung Patent. As shown in FIG. 4, the parallax barrier by Samsung is primarily composed of an upper ITO layer 13 and a lower ITO layer 16, whereas each of the two ITO layers 13, 16 is formed with two comb-shaped electrodes 13a, 13b, 16a, 16b that are alternatively disposed with respect to one another, as each of the four comb-shaped electrodes 13a, 13b, 16a, 16b is composed of a plurality of strip electrodes which are electrically connected. In addition, the comb-shaped electrodes 13a, 13b of the upper ITO layer 13 are arranged parallel to the Y axis while the comb-shaped electrodes 16a, 16b of the lower ITO layer 16 are arranged parallel to the X axis. Thus, the disposing orientation of the upper and lower comb-shaped electrodes are perpendicular to each other. Comparing with those conventional vertical strip parallax barriers, slantwise strip parallax barriers and slant-and-step parallax barriers, the structure of parallax barriers composed of comb-shaped electrodes is exactly the same as the structure of vertical strip parallax barriers.

Please refer to FIG. 5, which is a schematic diagram showing the electrical characteristics of the comb-shaped electrode of Samsung Patent while being applied in Landscape displaying mode. In the Landscape displaying mode, a driving voltage V is applied to one of the comb-shaped electrode 13a on the upper ITO layer 13 while the two comb-shaped electrodes 16a, 16b on the lower ITO layer 16 are grounded simultaneously. Thereby, the two comb-shaped electrodes 16a, 16b are used to constructed a common ground electrode, while the comb-shaped electrode 13a is used as a vertical strip parallax barrier for blocking and shielding the transmission of light.

Please refer to FIG. 6, which is a schematic diagram showing the electrical characteristics of the comb-shaped electrode of Samsung Patent while being applied in Portrait displaying mode. In the Portrait displaying mode, a driving voltage V is applied to one of the comb-shaped electrode 16a on the lower ITO layer 16 while the two comb-shaped electrodes 13a, 13b on the upper ITO layer 13 are grounded simultaneously. Thereby, the two comb-shaped electrodes 13a, 13b are used to constructed a common ground electrode, while the comb-shaped electrode 16a is used as a vertical strip parallax barrier for blocking and shielding the transmission of light.

Nevertheless, the parallax barrier of the Samsung Patent can not avoid the problem of light leakage. Please refer to FIG. 7, which is a schematic diagram showing a light leakage phenomenon caused by the parallax barrier of the Samsung Patent while being applied in Landscape displaying mode. While being activated electrically in a way shown in FIG. 5, the gaps 17 in the common ground electrode that is composed of the two comb-shaped electrodes 16a, 16b are not grounded, thus there is no proper electrical field being exerted upon the liquid crystals at positions corresponding to those gaps 17 for enabling they to perform the function of light blocking and shielding, causing an undesirable light leakage phenomenon to happen. Thereby, a severe cross-talk effect is resulted for deteriorating 3D performance.

At the same time, the parallax barrier of the Samsung Patent also can not avoid the problem of light leakage while being applied in Portrait displaying mode. Please refer to FIG. 8, which is a schematic diagram showing a light leakage phenomenon caused by the parallax barrier of the Samsung Patent while being applied in Portrait displaying mode. While being activated electrically in a way shown in FIG. 6, the gaps 18 in the common ground electrode that is composed of the two comb-shaped electrodes 13a, 13b are not grounded, thus there is no proper electrical field being exerted upon the liquid crystals at positions corresponding to those gaps 18 for enabling they to perform the function of light blocking and shielding, causing an undesirable light leakage phenomenon to happen. Thereby, a severe cross-talk effect is resulted for deteriorating 3D performance.

Moreover, the parallax barrier of the Samsung Patent also can not avoid the problem of color distortion while being applied in Portrait displaying mode. Please refer to FIG. 9 and FIG. 10, which are schematic diagram showing the relative relationship between a 2-view combined image and a parallax barrier of the Samsung Patent in Portrait displaying mode. As shown in FIG. 9 and FIG. 10, when a display screen 1 is positioned in a portrait manner, its RGB arrangement will become a horizontal arrangement, while the structure design of parallax barrier adopted by the Samsung Patent allows the opening width for each opening element 16c in this parallax barrier to be corresponded to one view unit composed of three RGB sub-pixels in the left view L and also allows the shielding width for each shield element 16a, i.e. the comb-shaped electrodes 16a, to be corresponded to one view unit composed of three RGB sub-pixels in the right view R. Consequently, the phenomenon of color distortion occurs that deteriorates the 3D performance severely when changing of viewing position.

Please refer to FIG. 11 to FIG. 13, which are schematic diagrams showing the relationship between color distortion phenomenon and the changing of viewing positions. Hereinafter, 3D perception of left eye is exemplified to illustrate the mechanism of color distortion phenomenon. As shown in FIG. 11, while the left eye 2 of a viewer is located exactly at an optimum viewing point OVP(L), only a left image L can be viewed clearly by the left eye 2 through all the opening elements 16c of the parallax barrier. However, as shown in FIG. 12, when the left eye 2 of the viewer is moved slightly to the left away from the OVP(L), through the same opening elements 16c the left eye can perceive light from a R-sub-pixel of a right image R in addition to the left image L, resulting the perceived 3D image to become reddish. On the other hand, as shown in FIG. 13, when the left eye 2 of the viewer is moved slightly to the right away from the OVP(L), through the same opening elements 16c the left eye can perceive light from a B-sub-pixel of a right image R in addition to the left image L, resulting the perceived 3D image to become bluish.

Please refer to FIG. 14, which is a schematic diagram showing a barrier electrode disclosed in the Masterimage Patent. As shown in FIG. 14, the parallax barrier provided by Masterimage is primarily composed of an upper electrode layer 13, having a plurality of cell-type electrodes formed thereon; and a lower electrode layer 16, not being illustrated in FIG. 14, designed to be used as a common ground electrode. Thus, a strip parallax barrier can be achieved with respect to the X axis and the Y axis by the connection of a matrix circuit and a driving voltage.

Please refer to FIG. 15, which is a schematic diagram showing the electrical characteristics of the cell-type electrodes of Masterimage Patent while being applied in Landscape displaying mode. In Landscape displaying mode, a driving voltage V is applied to the upper electrode layer 13 where all the cell-type electrodes arranged on even-number columns, i.e. c0, c2, c4, and c6, are electrically connected, so as to construct a vertical strip parallax barrier for blocking and shielding the transmission of light.

Please refer to FIG. 16, which is a schematic diagram showing the electrical characteristics of the cell-type electrodes of Masterimage Patent while being applied in Portrait displaying mode. In Landscape displaying, a driving voltage V is applied to the upper electrode layer 13 where all the cell-type electrodes arranged on even-number rows, i.e. r0, r2, and r4, are electrically connected, so as to construct a horizontal strip parallax barrier for blocking and shielding the transmission of light.

Nevertheless, the parallax barrier of the Masterimage Patent can not avoid the problem of light leakage. Please refer to FIG. 17, which is a schematic diagram showing a light leakage phenomenon caused by the parallax bather of the Masterimage Patent. Although strip-like barriers c0, c2, c4, c6, r0, r2, and r4 can be achieved through electrical connection, there are still gaps existed between the cell-type electrodes since the strip-like barriers is achieved by a number of serially connected cell-type electrodes. That is, no matter it is displayed in 3D portrait mode or in 3D landscape mode, there are always gaps existed respectively between any two neighboring cells, referring as barrier electrode gap. Thus, liquid crystals that are disposed in those gaps can not be driven by applied voltage for performing the preferred shielding effect, causing an undesirable light leakage phenomenon to happen in a manner similar to the Samsung Patent. Thereby, a severe cross-talk caused by the light leakage phenomenon deteriorates 3D performance. Please refer to FIG. 17 where two pictures of an activated Materimage barrier are illustrated. In FIG. 17, there are a plurality of short white lines that are clearly visible in the pictures no matter the barrier is being applied in Landscape displaying mode or in Portrait displaying mode.

Moreover, the parallax barrier of the Masterimage Patent also can not avoid the problem of color distortion. While being applied in Portrait displaying mode, the parallax barrier of the Masterimage Patent can performed similarly to the parallax barrier of the Samsung Patent with respect to the relative relationship between its structure and the 3D combined image, as shown in FIG. 9. Therefore, no further description for the parallax barrier of the Masterimage Patent relating to color distortion is provided herein.

To sum up, both the parallax barriers in the Samsung and Masterimage Patents are constructed using two strip barriers that are arranged perpendicular to each other and respectively disposed on two ITO layers in a LC device, i.e. a LC device of double ITO electrode layer, while enabling a display screen to provide 2D/3D image switching and dual-directional 3D image displaying. However, due to the faulty design in its barrier electrode, the unavoidable light leakage through the designed shielding areas causes severe cross-talk effect. Further, for a display screen having R, G, and B sub-pixels in a strip configuration that is used in Portrait mode, the 3D image being displayed suffers severe color distortion also due to the faulty design in its barrier electrode.

There are already many studies being provided in response to the aforesaid problems of light leakage and color distortion. One of which is a multi-functional liquid crystal parallax barrier device disclosed in TW Pat. Publication No. 201124769, and is substantially a LC device mainly formed by two independently disposed common electrode layers, i.e. an upper common electrode layer and a lower electrode layer, and two independently disposed barrier electrode layers, i.e. an upper barrier electrode layer and a lower barrier electrode layer. Thereby, the aforesaid multi-functional liquid crystal parallax barrier device, being referred as an LC device with four-layered electrode structure hereinafter, is capable of resolving the light leakage problem. In addition, each of the upper and the lower barrier electrode layer can be a vertical strip parallax barrier, a slantwise strip parallax barrier, or a slant-and-step parallax barrier. However, it is noted that such aforesaid patent did not mention any effective solution for solving the color distortion issue.

Another such study is a dual-direction device for displaying three-dimensional images that is disclosed in TW Pat.— Publication No. 201133032, which is also an LC device with four-layered electrode structure designed to be applied in a display screen having R, G, and B sub-pixels in a strip configuration. Operationally, when the R, G, and B sub-pixels are vertically arranged for Landscape displaying mode, a structure of vertical strip parallax barrier is used for displaying 3D images, and on the other hand, when the R, G, and B sub-pixels are horizontally arranged for Portrait displaying mode, a structure of slant-and-step parallax barrier is used for displaying 3D images, so as to achieve the purpose of dual-directional 3D images displaying while solving the issue of color distortion at the same time. In addition, in this patent application, the abovementioned vertical strip parallax barrier and slant-and-step parallax barrier are optimized for working cooperatively with a corresponding multi-view 3D image combined formulas and also the optimization conditions for obtaining optimal viewing distance in each displaying mode are provided. That is, by enabling both the minimum horizontal display unit and the minimum vertical display unit of a view image to have the same width, the display screen can have the same optimal viewing distance in both the Landscape and Portrait displaying mode, so as to achieve the convenience of usage in 3D application.

Another such study is also a dual-direction device for displaying three-dimensional images that is disclosed in TW Pat. Publication No. 201209448, which is also an LC device with four-layered electrode structure, but is designed to be applied in a display screen having R, G, and B sub-pixels in a delta configuration and mosaic configuration. With the aforesaid device, the required vertical strip parallax barrier and slant-and-step parallax barrier are optimized for working cooperatively with a corresponding multi-view 3D image combined formulas so as to resolve the issues of light leakage and color distortion.

Furthermore, there is a dual-direction device for displaying three-dimensional images that is disclosed in TW Pat. Publication No.—201209450, which is also an LC device with four-layered electrode structure, but is designed to be applied in a display screen having R, G, and B sub-pixels in a delta configuration. With the aforesaid device, the required vertical strip parallax barrier and slantwise strip parallax barrier are optimized for working cooperatively with a corresponding multi-view 3D image combined formulas so as to resolve the issues of light leakage and color distortion.

Moreover, there is further a multi-view three-dimensional image displaying method disclosed in TW Pat. Publication No. 201243393. Although the aforesaid patent has no relation with the dual-directional displaying, it discloses a further 3D art for a display screen having R, G, and B sub-pixels in a strip configuration while the R, G, and B sub-pixels being arranged horizontally. In this patent application, the required slantwise strip parallax barrier is optimized and provided for working cooperatively with a corresponding multi-view 3D image combined formulas so as to be used for displaying 3D images without color distortion.

To sum up, in the aforesaid TW patents, the light leakage problem is solved by the design of an LC device with four-layered electrode structure, whereas the issue of color distortion is resolved by the optimization designs of a slantwise strip parallax barrier and a slant-and-step parallax barrier.

However, in the field of 3D display utilizing the principle of parallax barrier and having both 2D/3D image switching and dual-directional 3D image displaying abilities, those aforesaid patents are not able to provide a LC device with single-layered barrier electrode structure that can not only provide both 2D/3D image switching and dual-directional 3D image displaying functions, but also capable of solving the problems of light leakage and color distortion. Not to mention that there is no such LC devices existed today that is designed based upon the lenticular technology. Therefore, the goal of present invention is to use a single-layered electrode to equip the parallax barrier or the lenticular structure, so as not only to achieve the purpose of 2D/3D image switching and dual-directional 3D image displaying, but also solve the problems of light leakage and color distortion.

SUMMARY OF THE INVENTION

In view of the disadvantages of prior art, the primary object of the present invention is to provide a dual-directional 3D image displaying method, being used in a case when a flat-panel display screen and a view separation device are used for dual-directional 3D image displaying, which comprises the steps of: using a display screen having a sub-pixel arrangement of 45-degree slant angle to display a multi-view 3D combined image; and using a view separation device featured by a 45-degree slant angle to perform a view separation operation upon the multi-view 3D combined image. Thereby, an object of dual-directional displaying of 3D images can be achieved using only one view separation device, without being bothered by conventional problems, such as cross-talk and color distortion.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 4 is a schematic diagram showing a barrier electrode disclosed in the Samsung Patent.

FIG. 17 is a photo showing a light leakage phenomenon caused by the parallax barrier of the Masterimage Patent.

FIG. 25 and FIG. 26 are schematic diagrams showing that V(i,j) represents an image data to be registered in a memory at the location (i,j).

FIG. 27 to FIG. 30 are schematic diagrams showing various 2-view 3D combined images.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
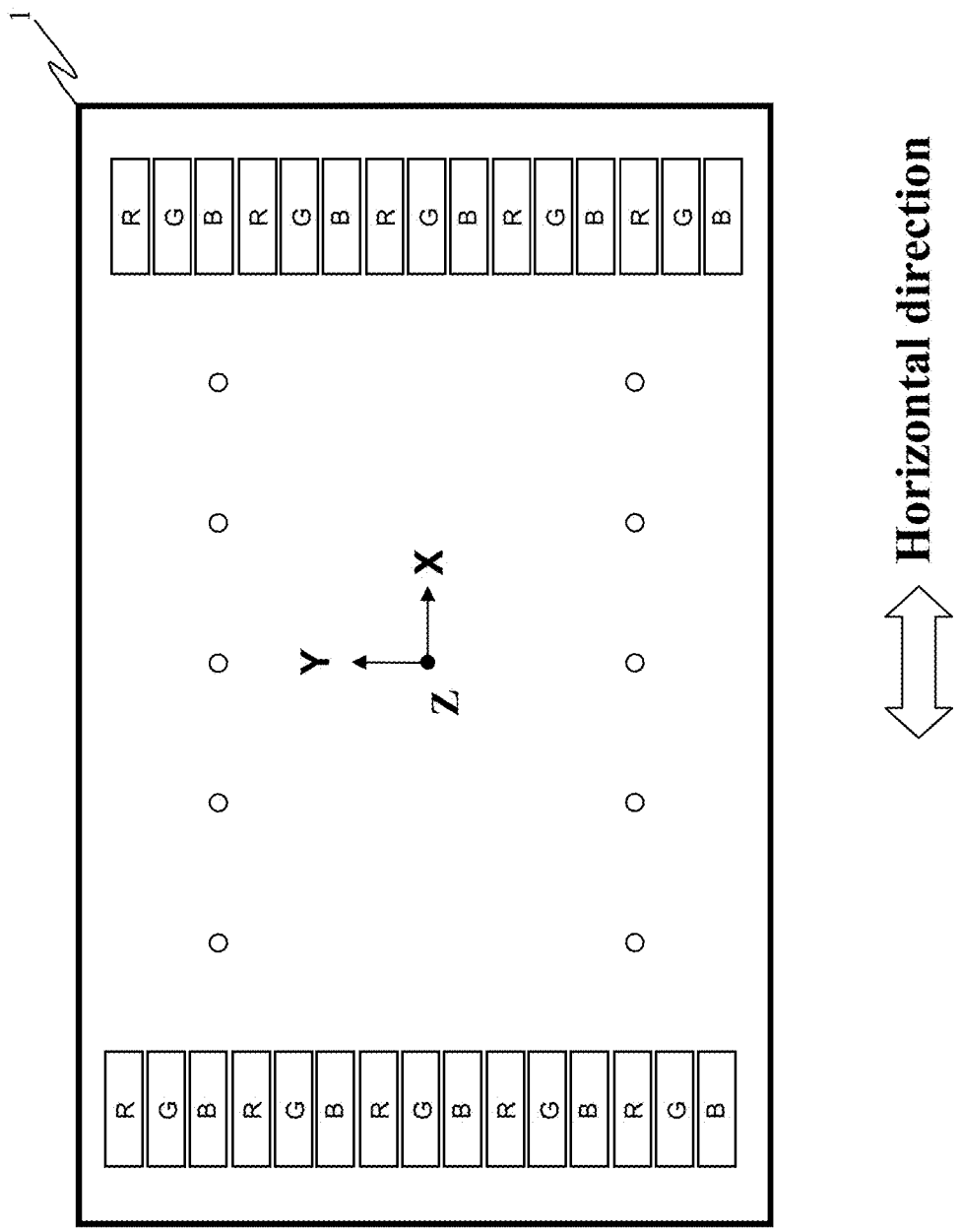
FIG. 1 is a schematic diagram showing a display in a Landscape displaying mode.
Figure 2:
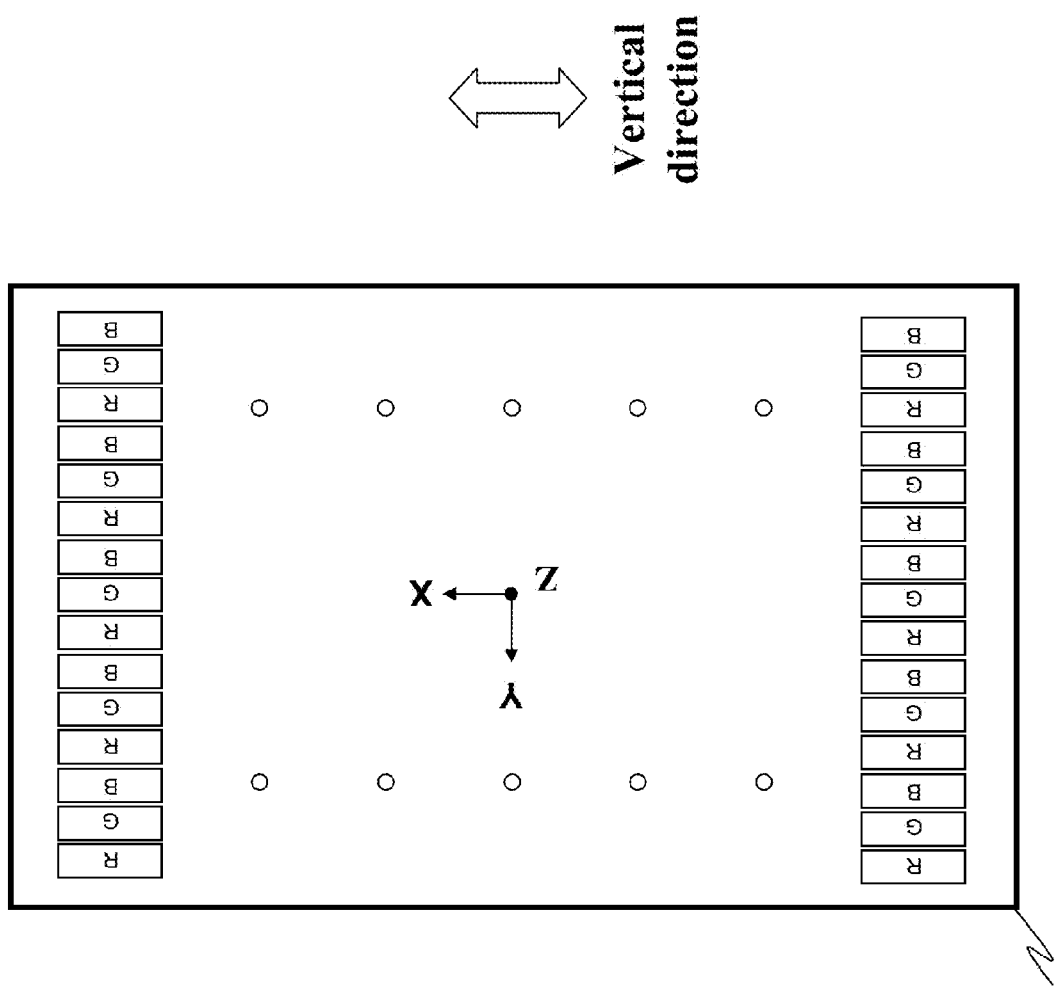
FIG. 2 is a schematic view is a schematic diagram showing a display in a Portrait displaying mode.
Figure 3:
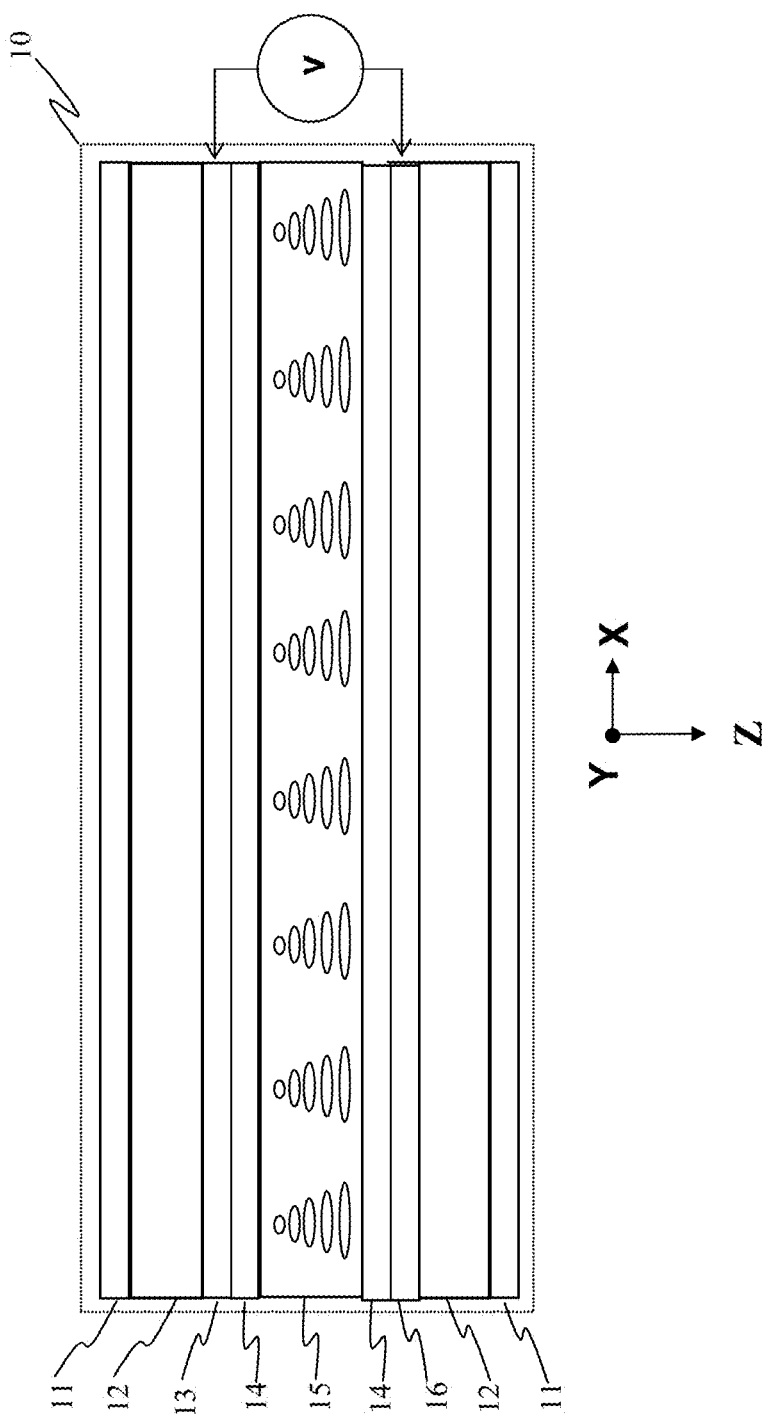
FIG. 3 is a schematic diagram showing a conventional liquid crystal parallax barrier.
Figure 5:
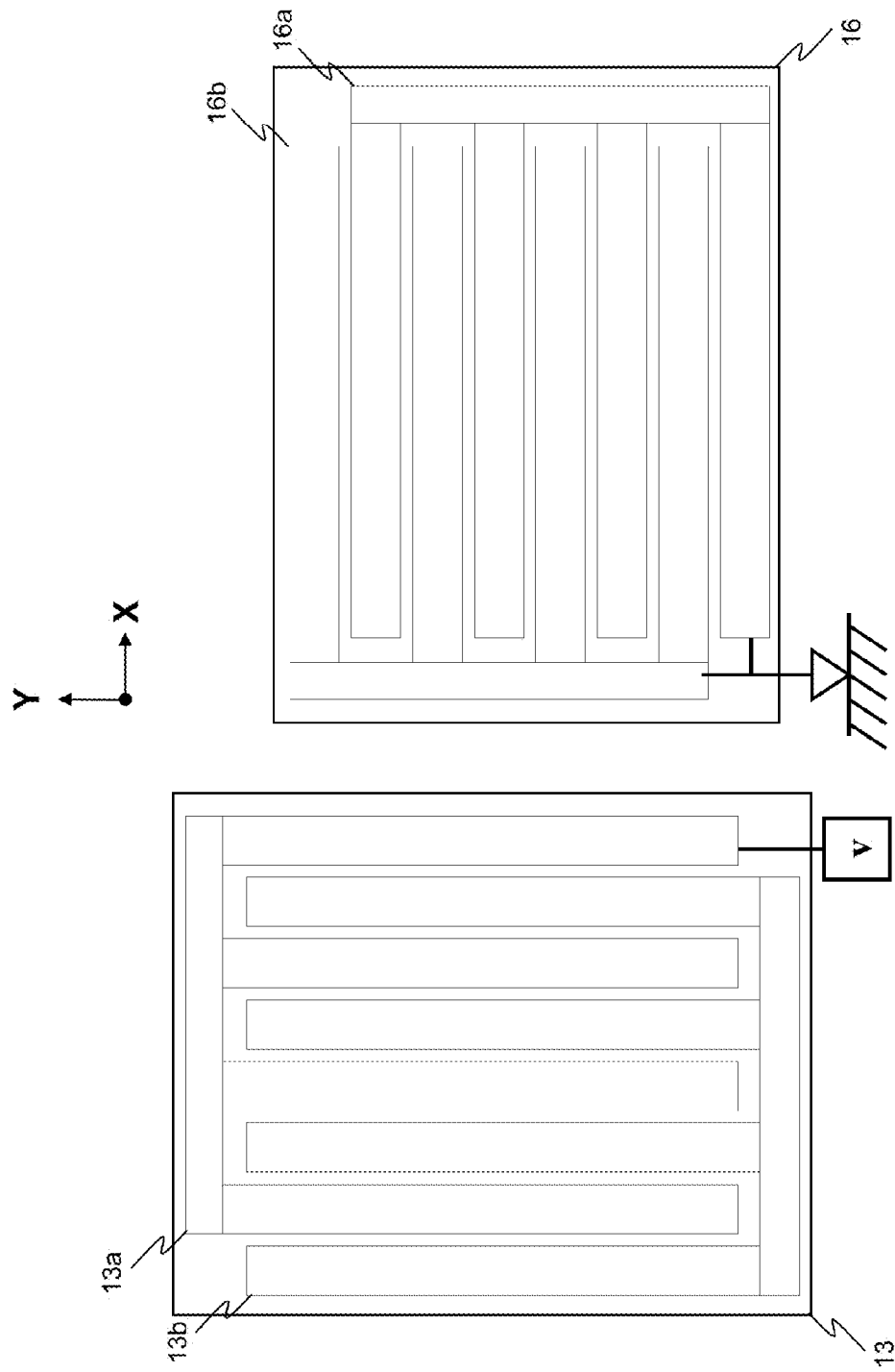
FIG. 5 is a schematic diagram showing the electrical characteristics of the comb-shaped electrode of Samsung Patent while being applied in Landscape displaying mode.
Figure 6:
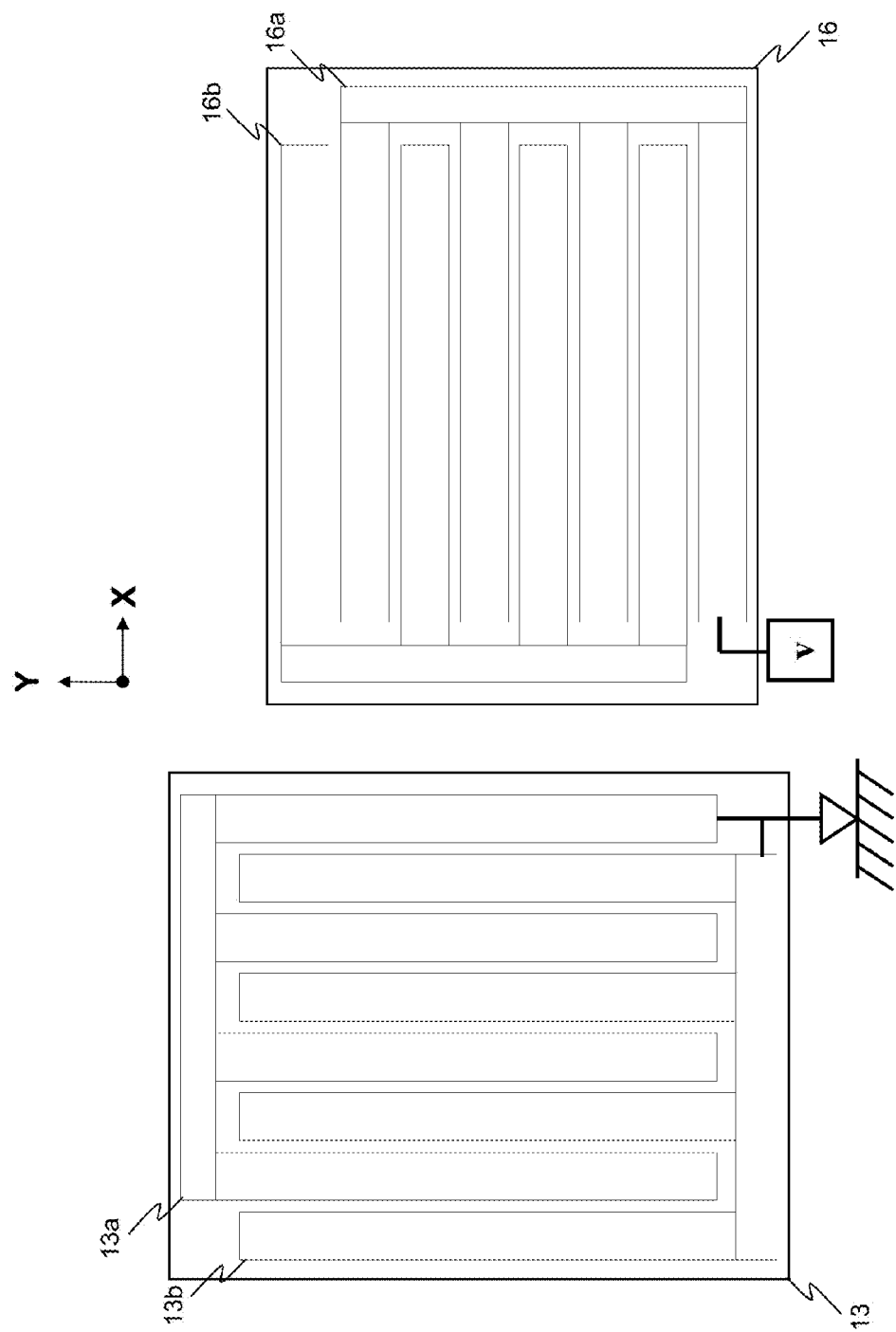
FIG. 6 a schematic diagram showing the electrical characteristics of the comb-shaped electrode of Samsung Patent while being applied in Portrait displaying mode.
Figure 7:
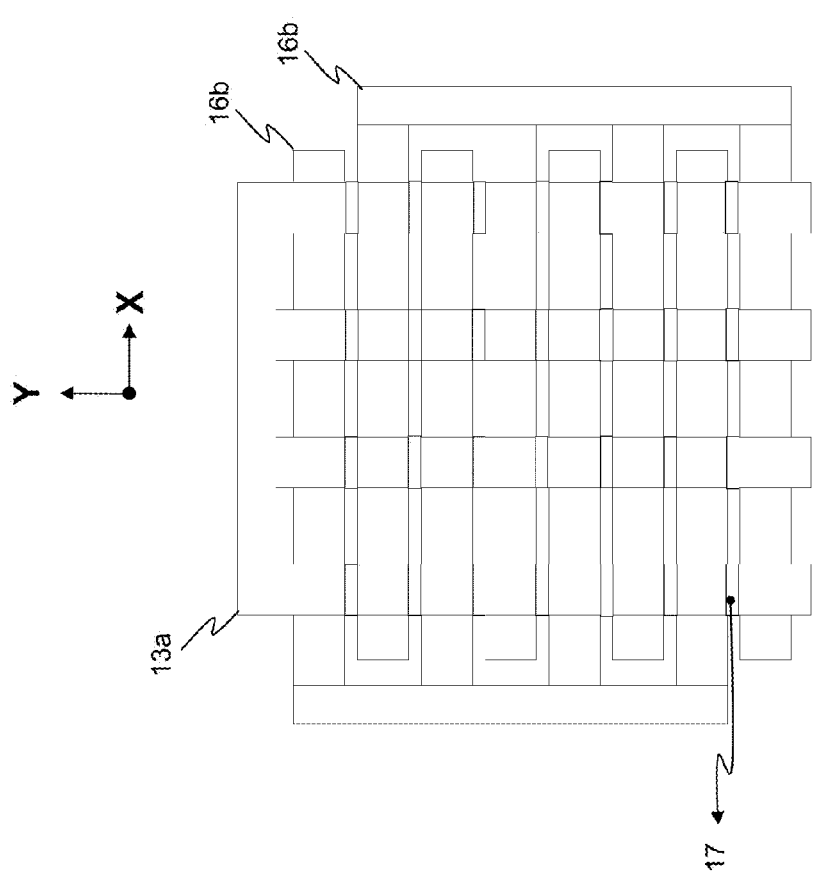
FIG. 7 is a schematic diagram showing a light leakage phenomenon caused by the parallax barrier of the Samsung Patent while being applied in Landscape displaying mode.
Figure 8:
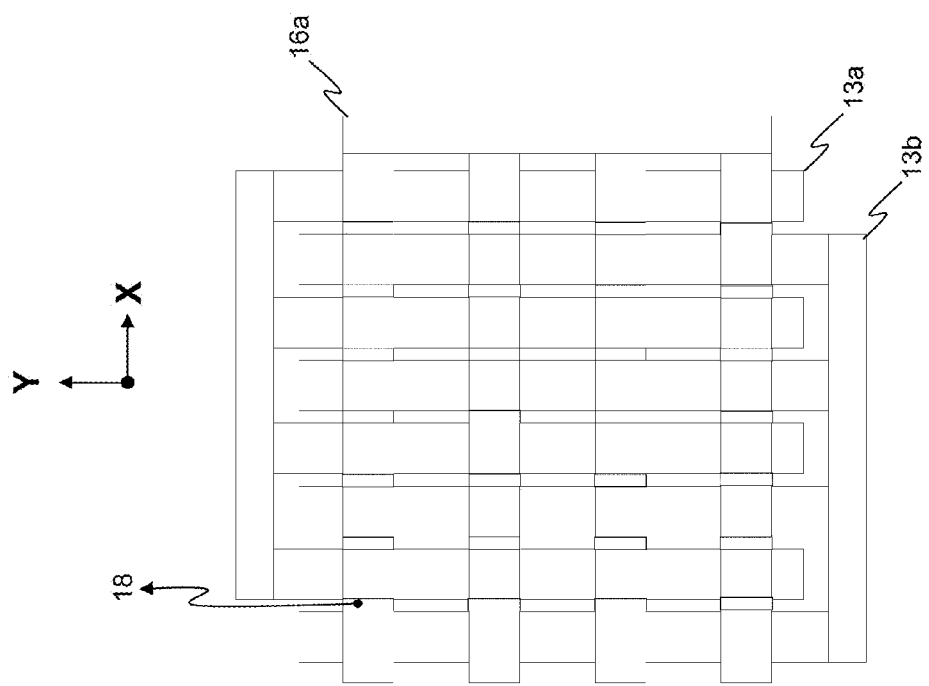
FIG. 8 is a schematic diagram showing a light leakage phenomenon caused by the parallax barrier of the Samsung Patent while being applied in Portrait displaying mode.
Figure 9:
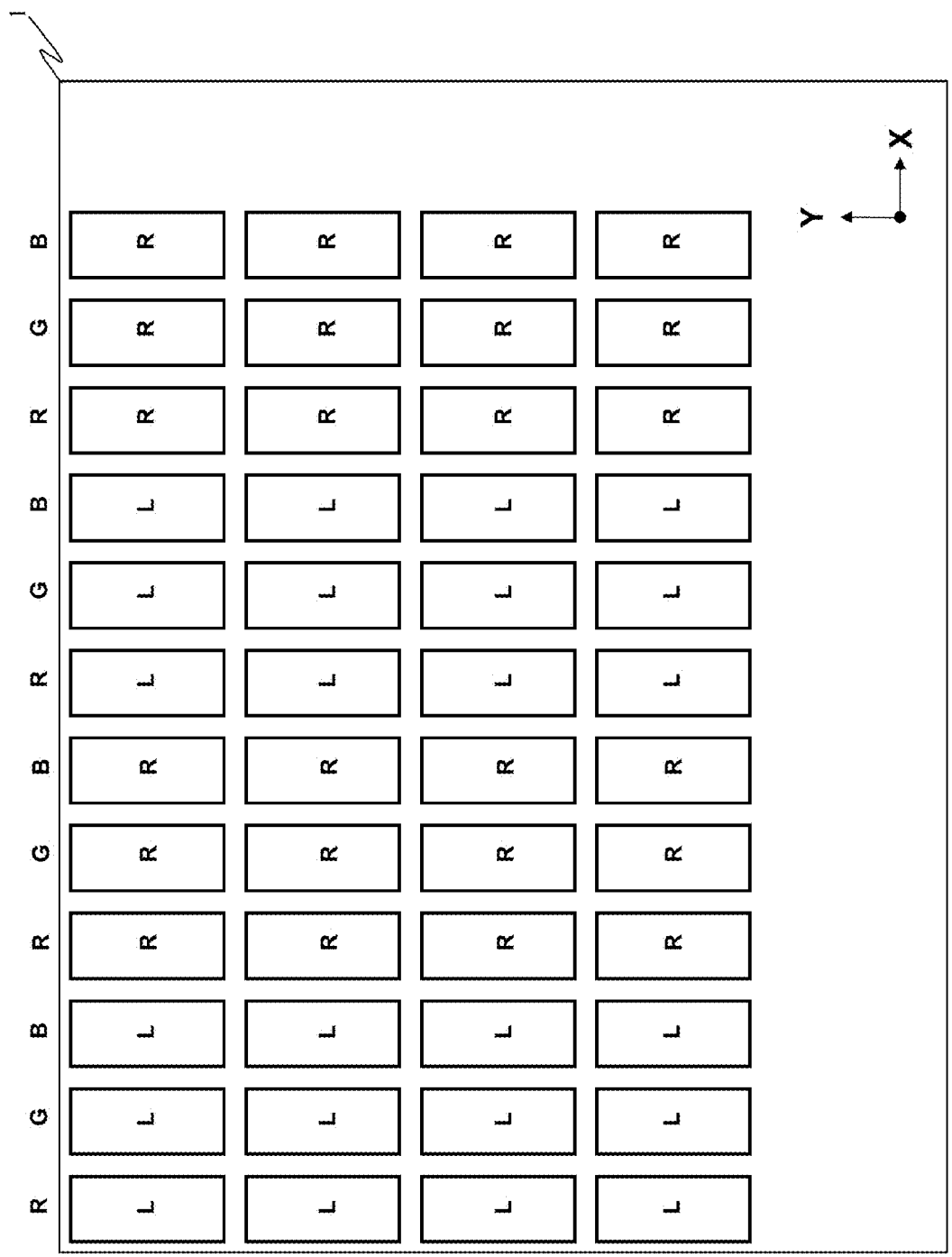
FIG. 9 is schematic diagram showing a 2-View combined 3D image.
Figure 10:
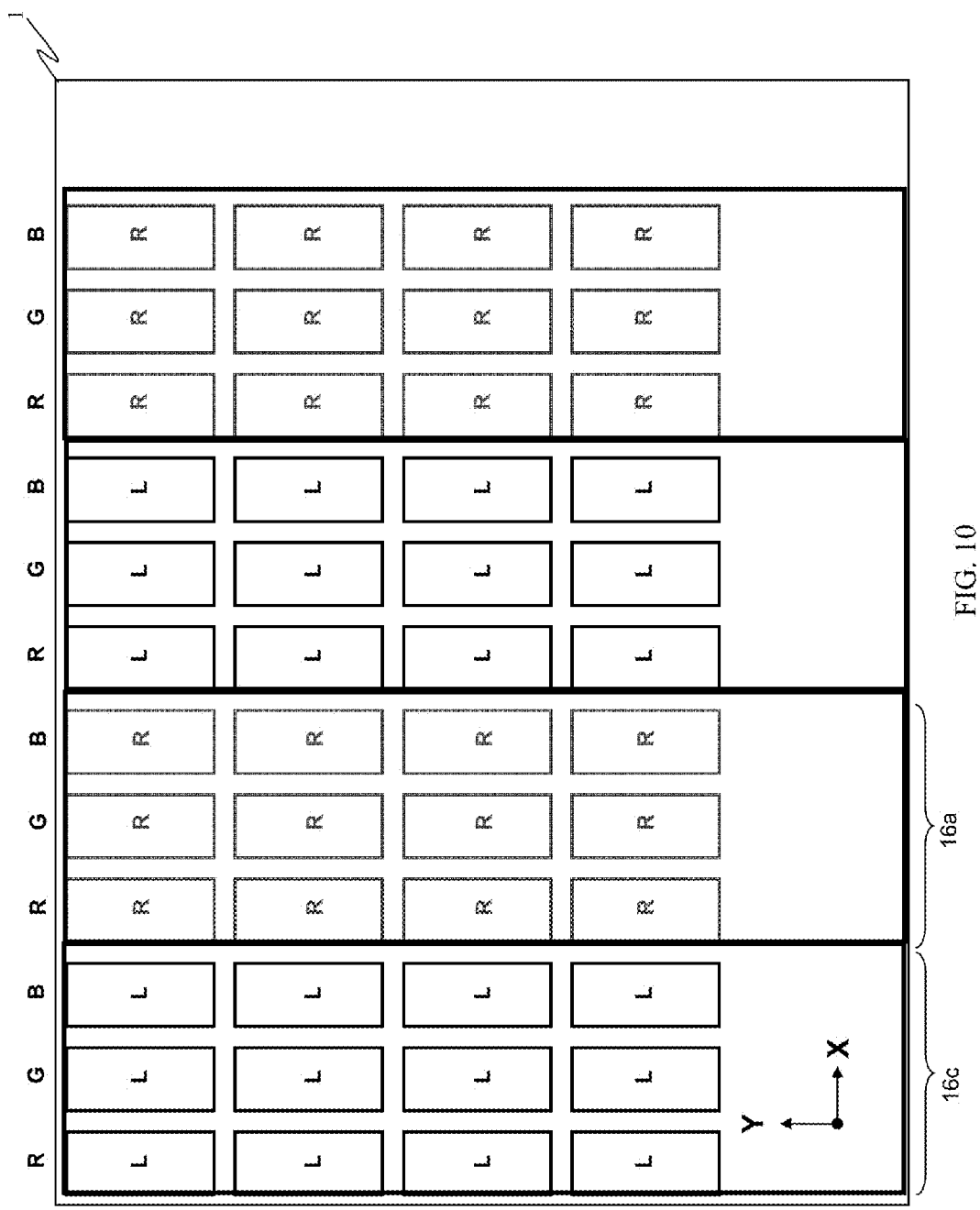
FIG. 10 is a schematic diagram showing a parallax barrier structure.
Figure 11:
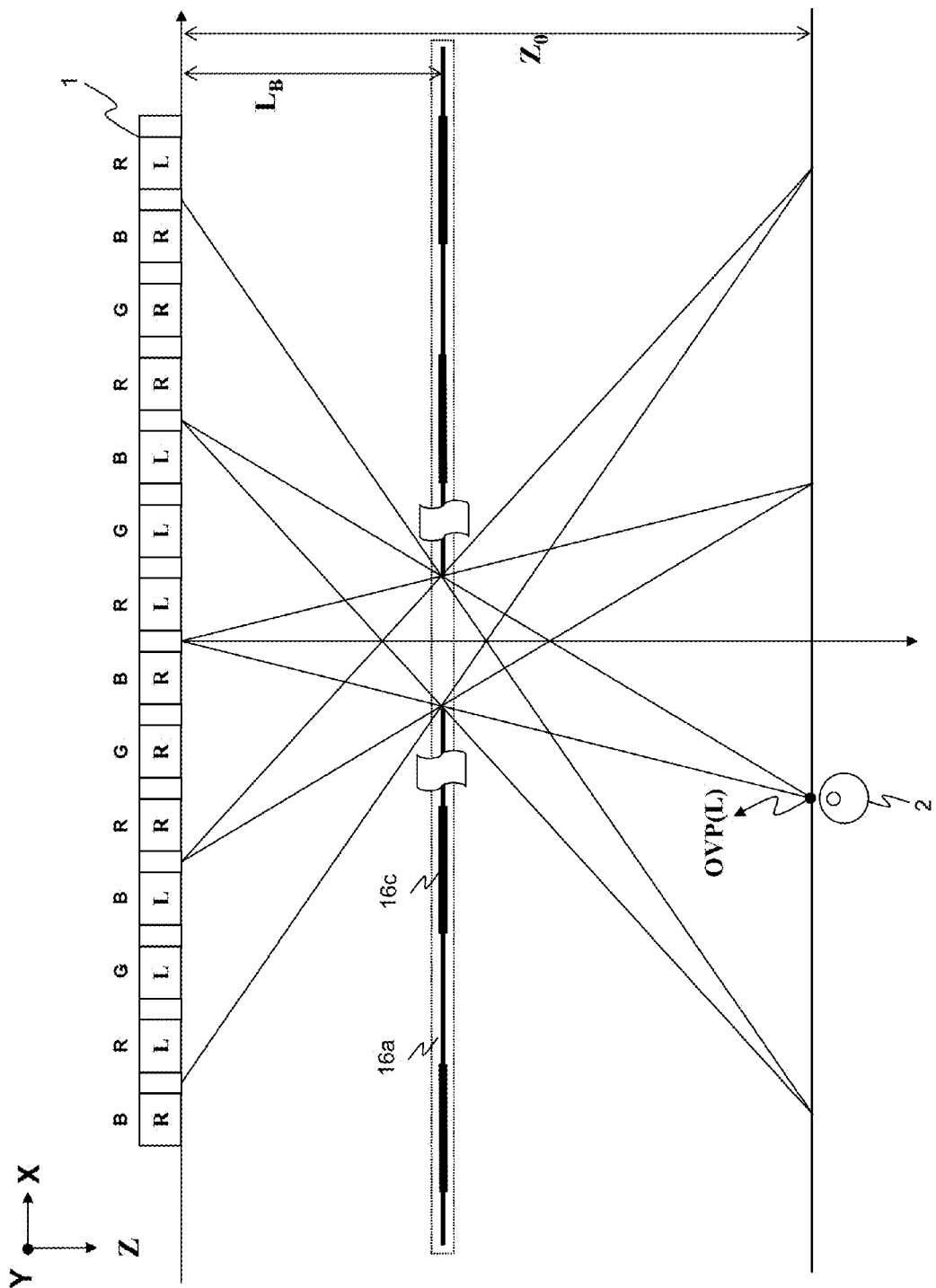
FIG. 11 to FIG. 13 are schematic diagrams showing the relationship between color distortion phenomenon and the changing of viewing positions.
Figure 12:
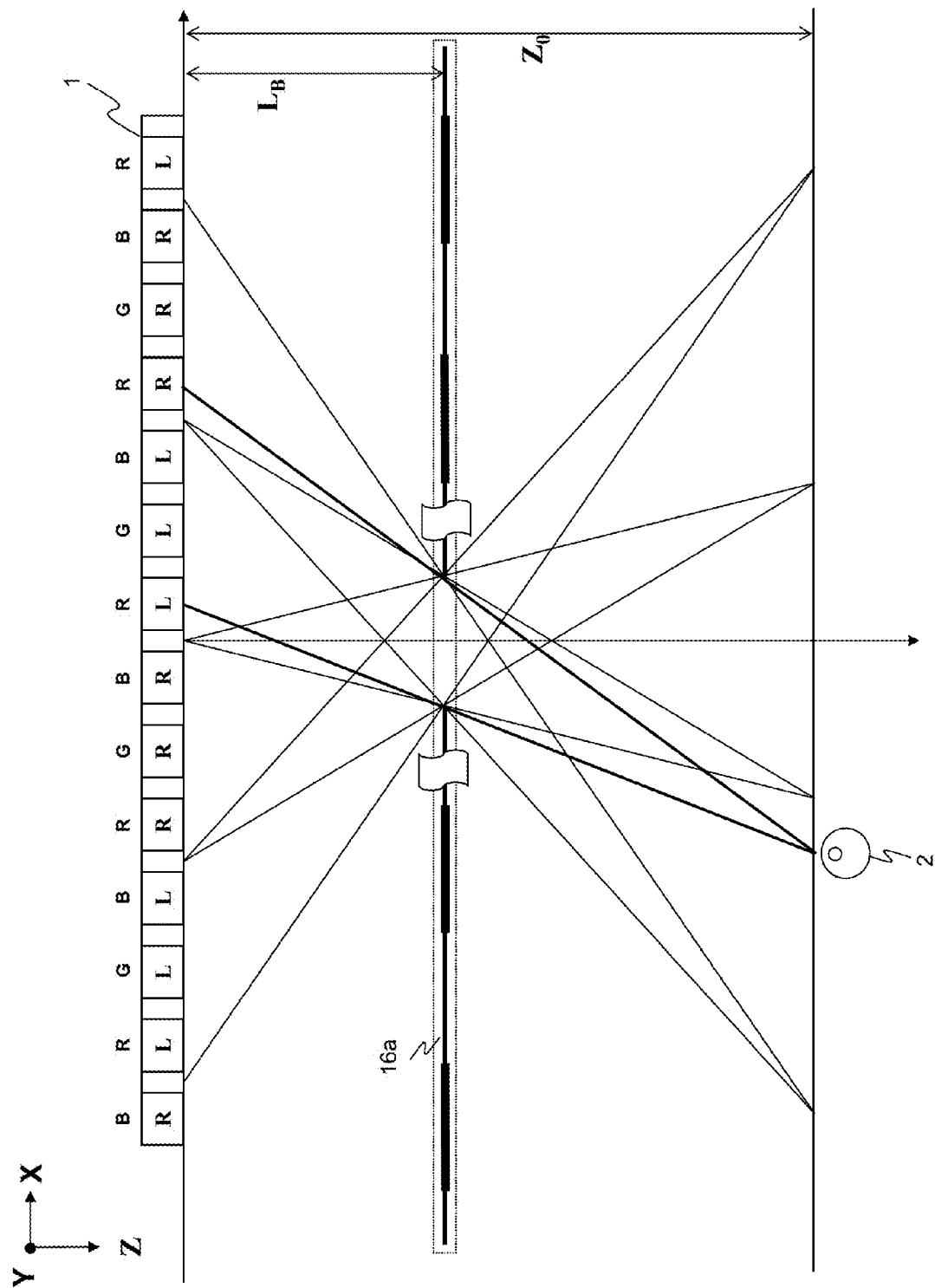
Figure 13:
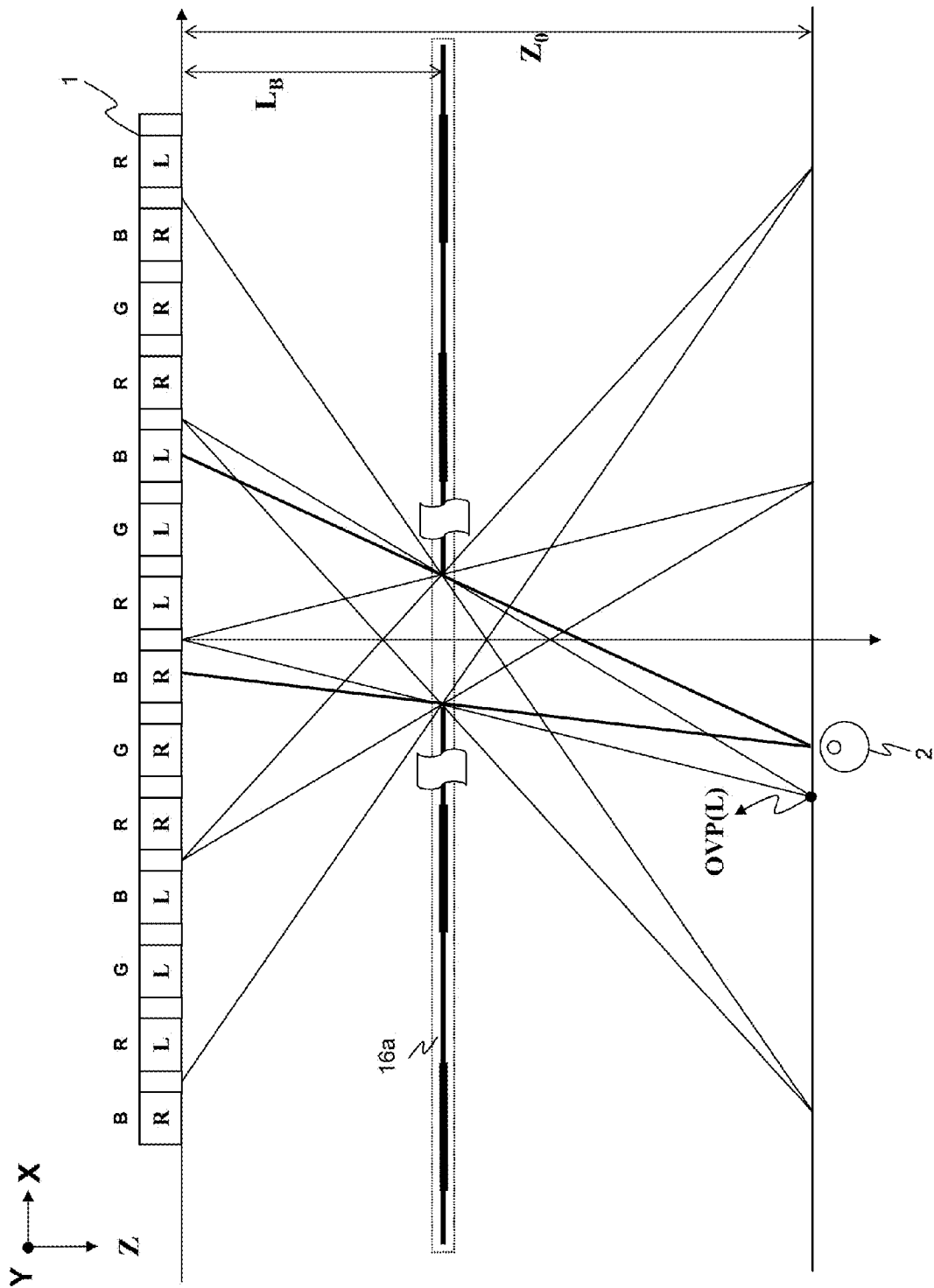
Figure 14:
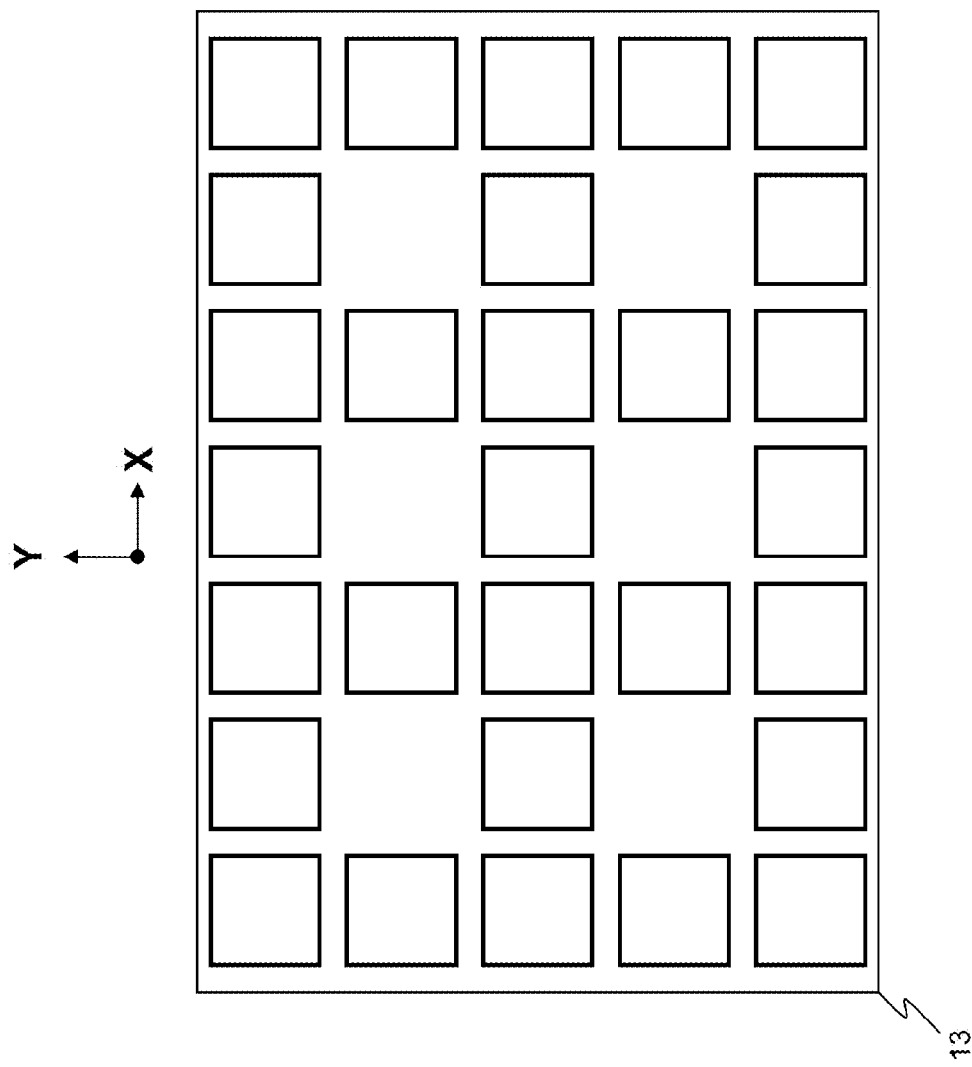
FIG. 14 is a schematic diagram showing a barrier electrode disclosed in the Masterimage Patent.
Figure 15:
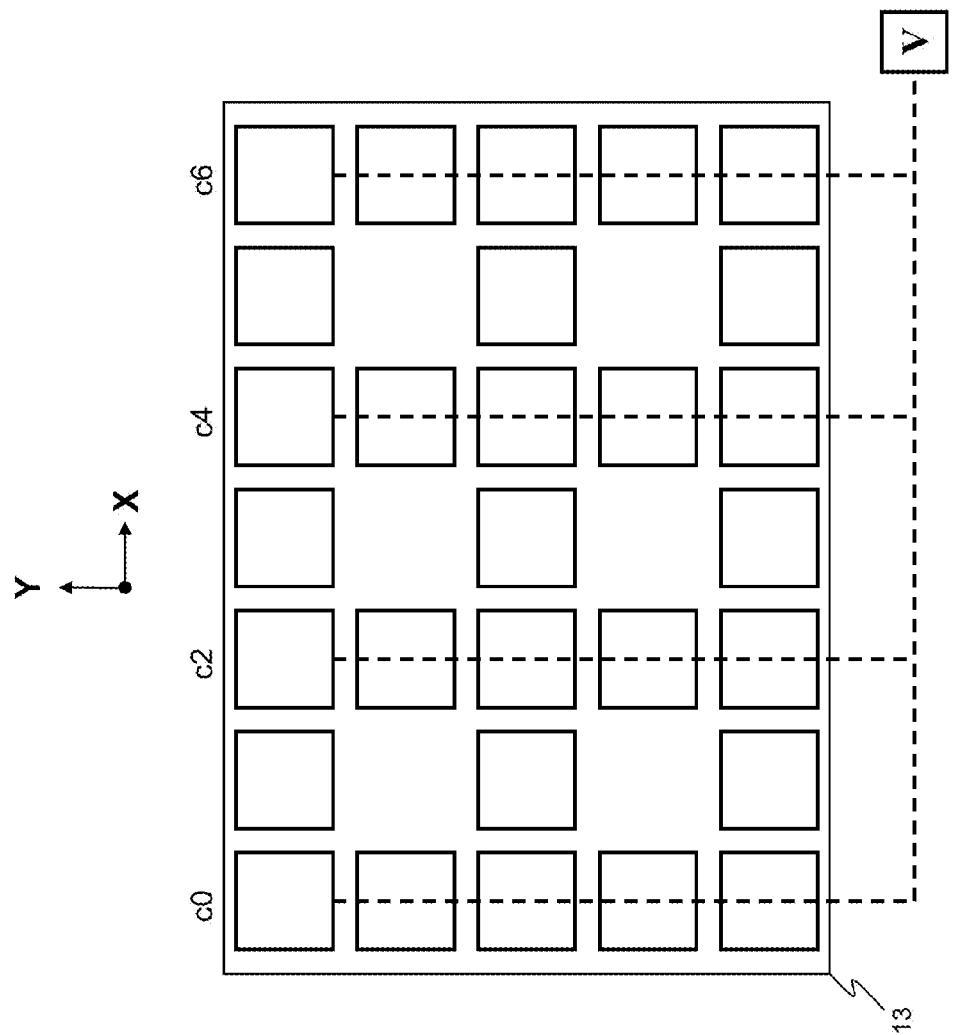
FIG. 15 is a schematic diagram showing the electrical characteristics of the cell-type electrodes of Masterimage Patent while being applied in Landscape displaying mode.
Figure 16:
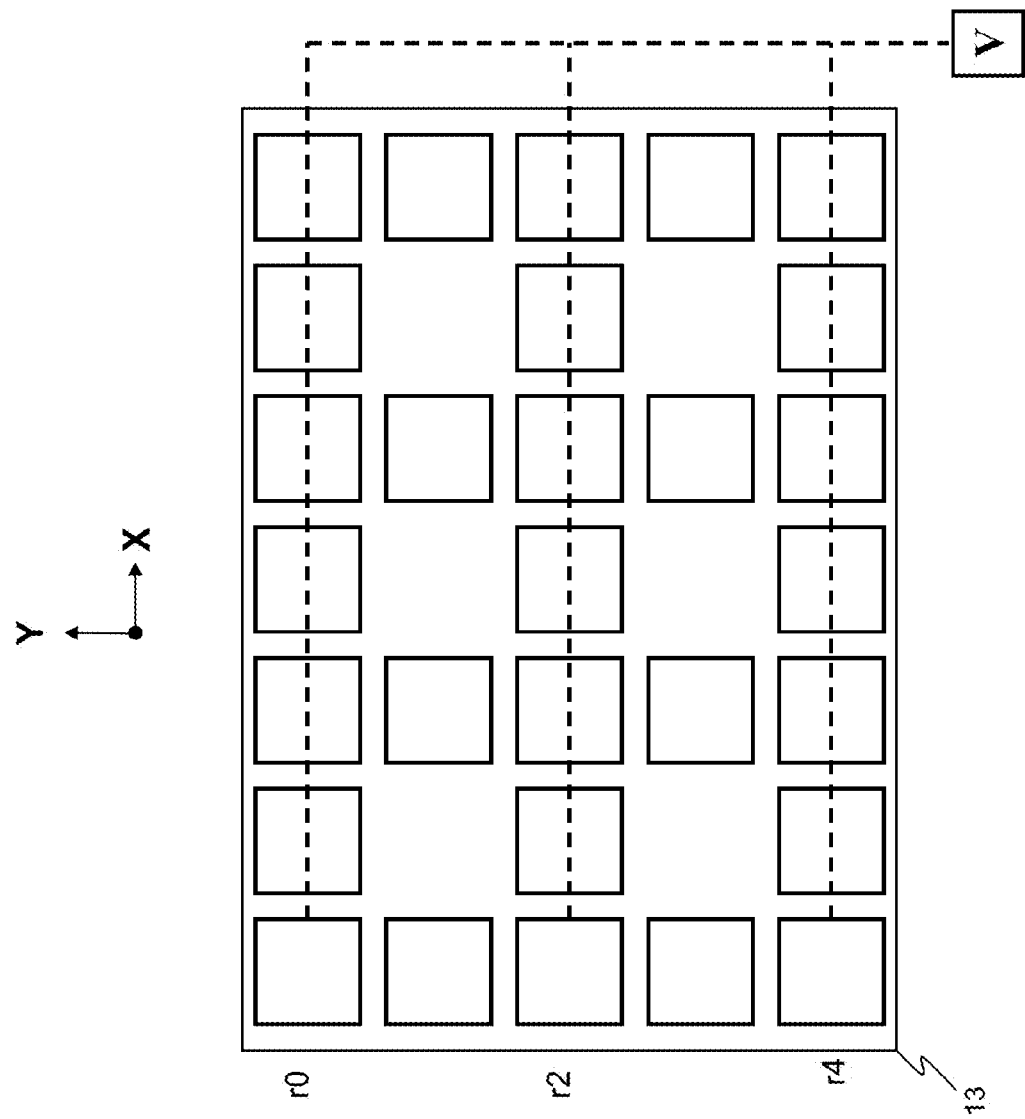
FIG. 16 is a schematic diagram showing the electrical characteristics of the cell-type electrodes of Masterimage Patent while being applied in Portrait displaying mode.
Figure 18:
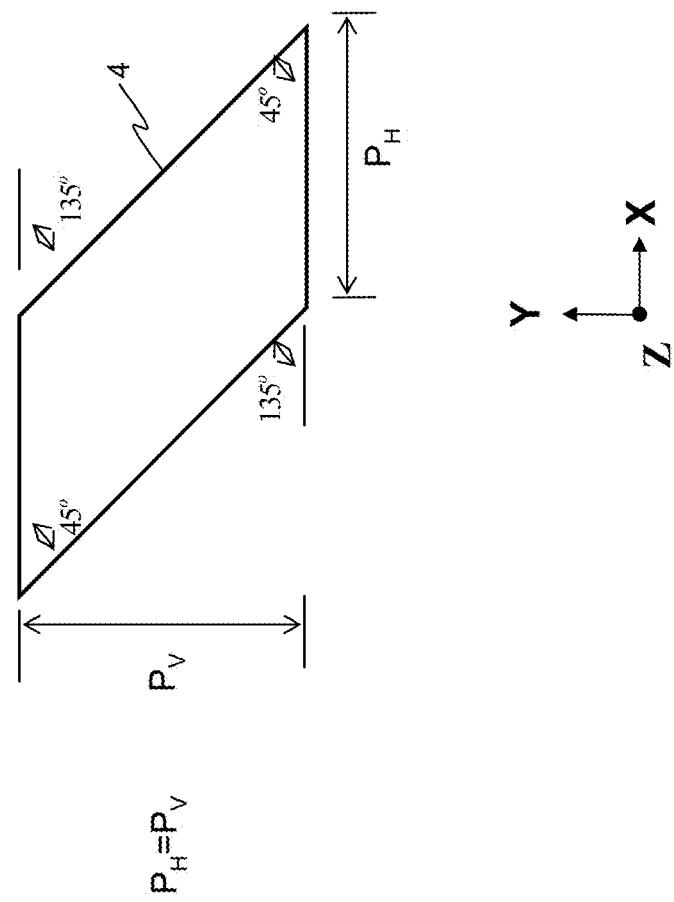
FIG. 18 to FIG. 20 are schematic diagrams showing RGB sub-pixel having a geometric boundary featured by 45-degree slant angle.
Figure 19:
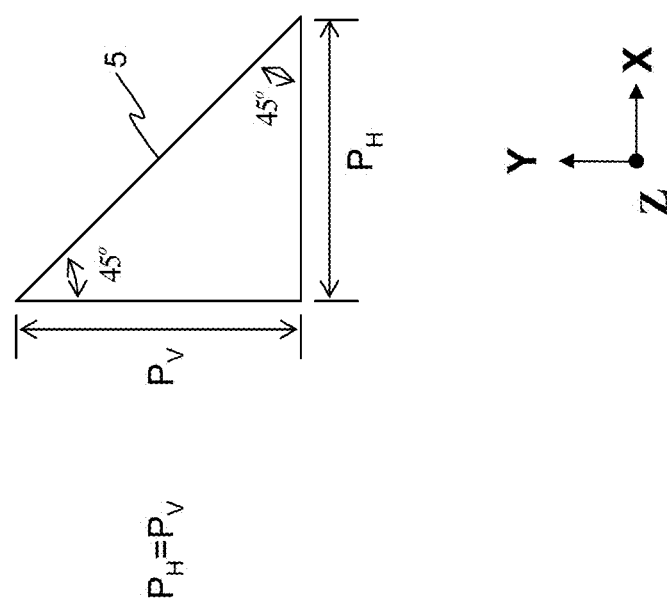
Figure 20:
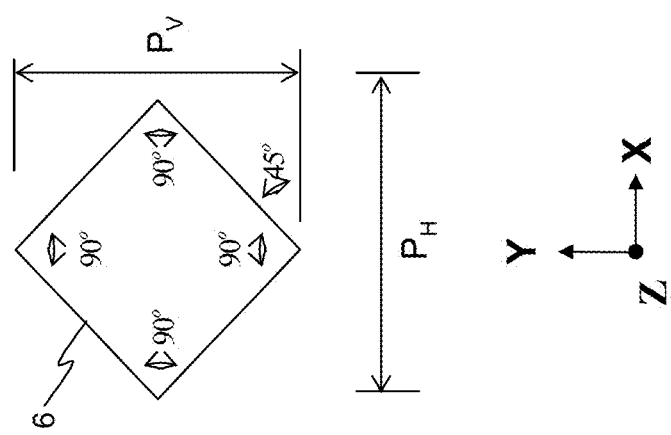

Please refer to FIG. 18 to FIG. 20, which are schematic diagrams showing a RGB sub-pixel having a geometric boundary featured by a 45-degree slant angle. The regular colors of sub-pixels adopted by the regular display screen are red (R), green (G), blue (B) and white (W). Hereinafter, only R, G, B are used for the description and illustration. The aforesaid single one sub-pixel 4, 5, 6 is formed in a shape selected from the group consisting of: a parallelogram having 45-degree internal angle 4, an isosceles right triangle 5, and a square 6. With respect to a Cartesian coordinate system of XYZ-axes defined on the display screen, each sub-pixel 4, 5, 6 in the display screen is arranged and orientated in a direction with an intersection angle of 45 degree to be formed between at least one side of each sub-pixel and the horizontal direction of the display screen. Thereby, the display screen that is determined according to the configuration of the aforesaid RGB sub-pixels is a screen selected from the group consisting of: a display screen with quadrilateral-shaped configuration, a display screen with triangle-shaped configuration and a display screen with square-shaped configuration, as illustrated in FIG. 21~FIG. 24. In addition, each single sub-pixel 4, 5, or 6 has a size of $P_H \times P_V$, and $P_H = P_V$, whereas $P_H$ represents the horizontal width of a single sub-pixel and $P_V$ represents the vertical height of a single sub-pixel.

Figure 21:
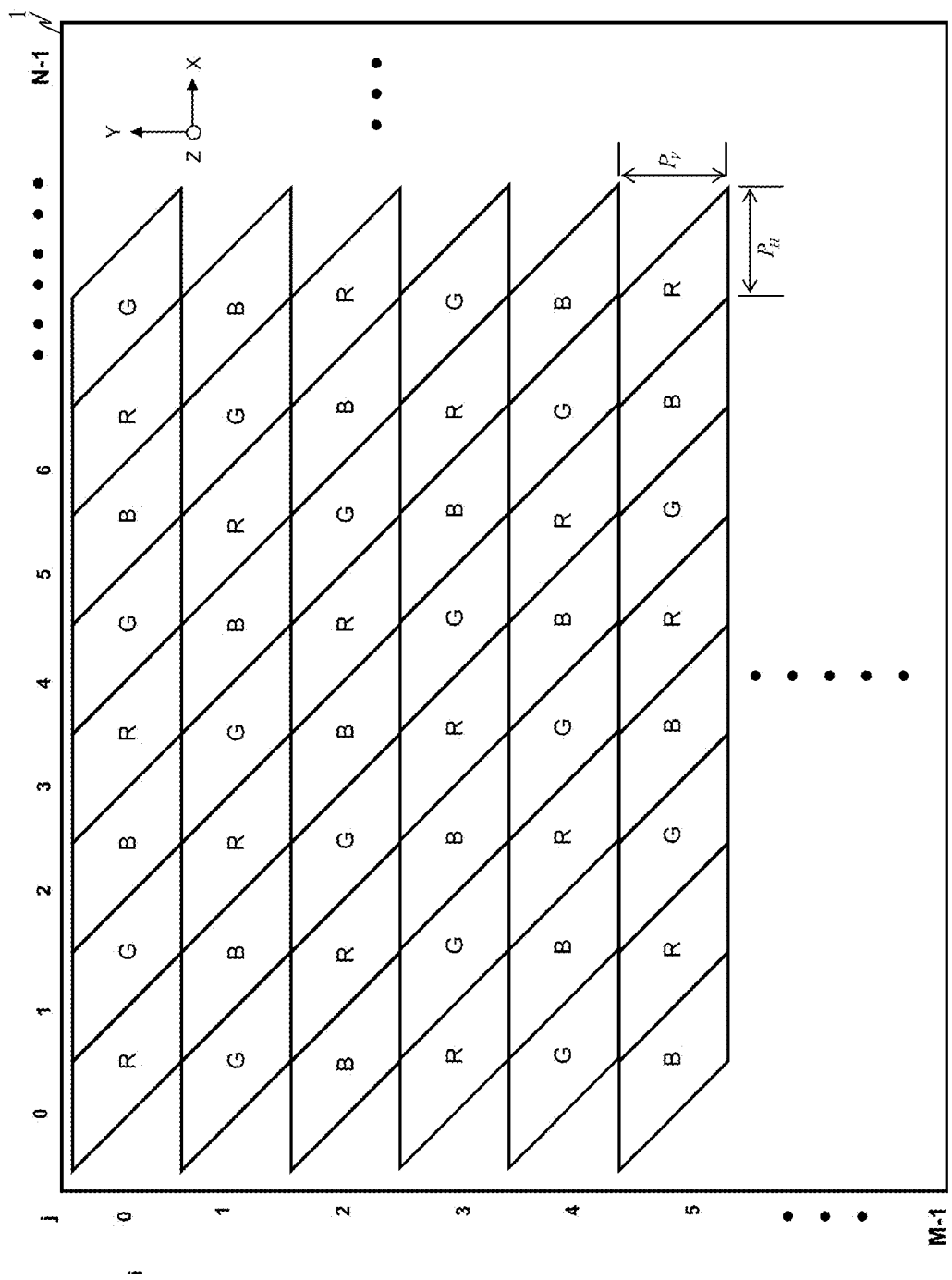
FIG. 21 is a schematic diagram showing a display screen with quadrilateral-shaped configuration.

Please refer to FIG. 21, which is an exemplary display screen with quadrilateral-shaped configuration. In the display screen with quadrilateral-shaped configuration, the sub-pixels are arranged in a [R, G, B] ordering from left to right on the horizontal direction, and in a [R, G, B] ordering from top to bottom on the vertical direction, and in a [R, B, G], [G, R, B], [B, G, R] ordering from top to bottom following a direction slanting to the right by the angle of 45-degree, while enabling no mono-color linear arrangement to be constructed in the RGB arrangement of the sub-pixels in any of the vertical direction, the horizontal direction and the direction slanting to the right by the angle of 45-degree. It is noted that the so-called direction slanting to the right by the angle of 45-degree is referred to a direction aligning with a line connecting the upper left corner of the display screen to the lower right corner of the display screen.

Figure 22:
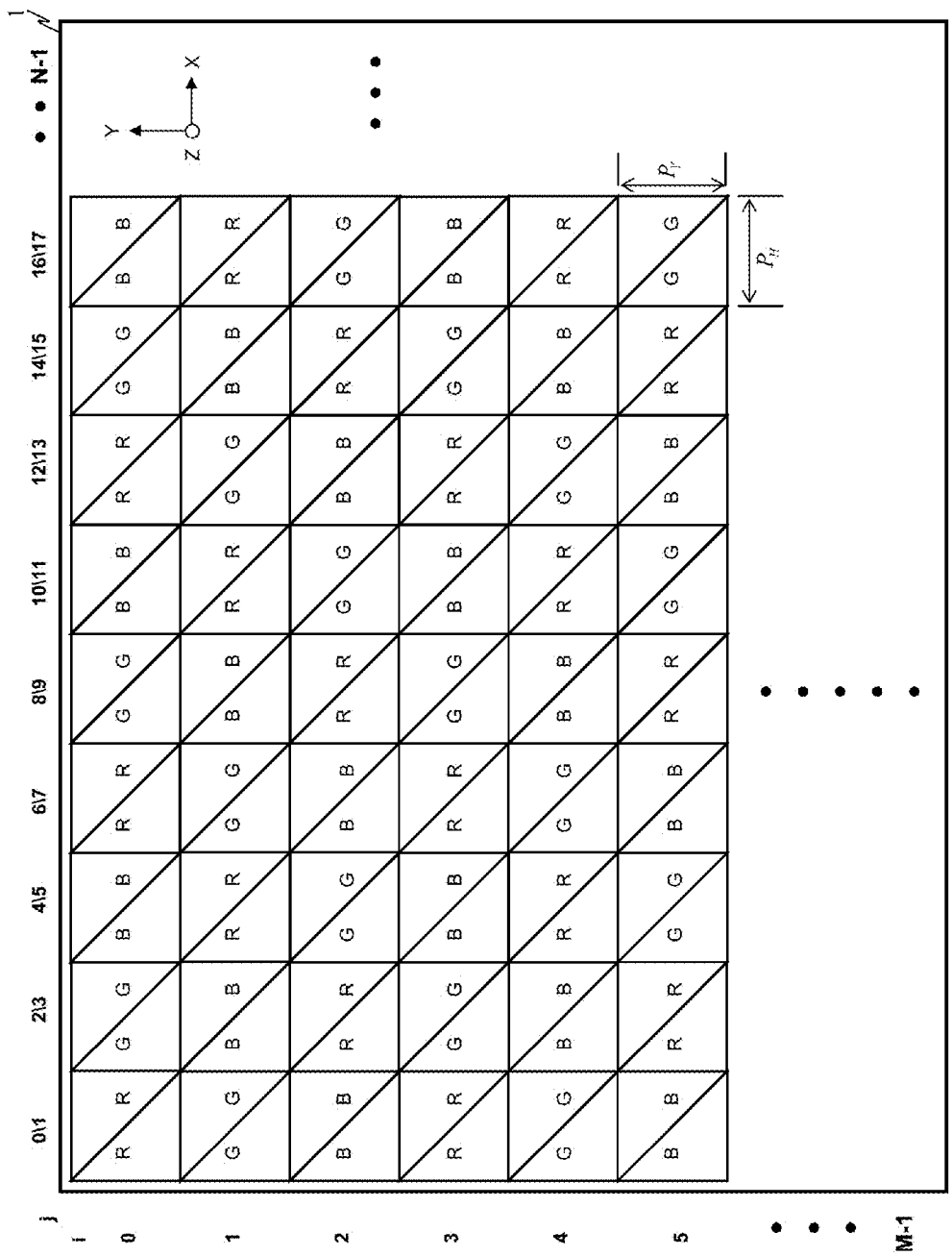
FIG. 22 is a schematic diagram showing a display screen with triangular-shaped configuration.

Moreover, in the display screen with triangle-shaped configuration, as illustrated in FIG. 22, sub-pixel units composed of two horizontally neighboring sub-pixels with the same color are arranged in the same way as those sub-pixels arranged in the display screen with quadrilateral-shaped configuration, and also there will be no mono-color linear arrangement to be constructed in the RGB arrangement of the sub-pixels in any of the vertical direction, the horizontal direction and the direction slanting to the right by the angle of 45-degree.

Figure 23:
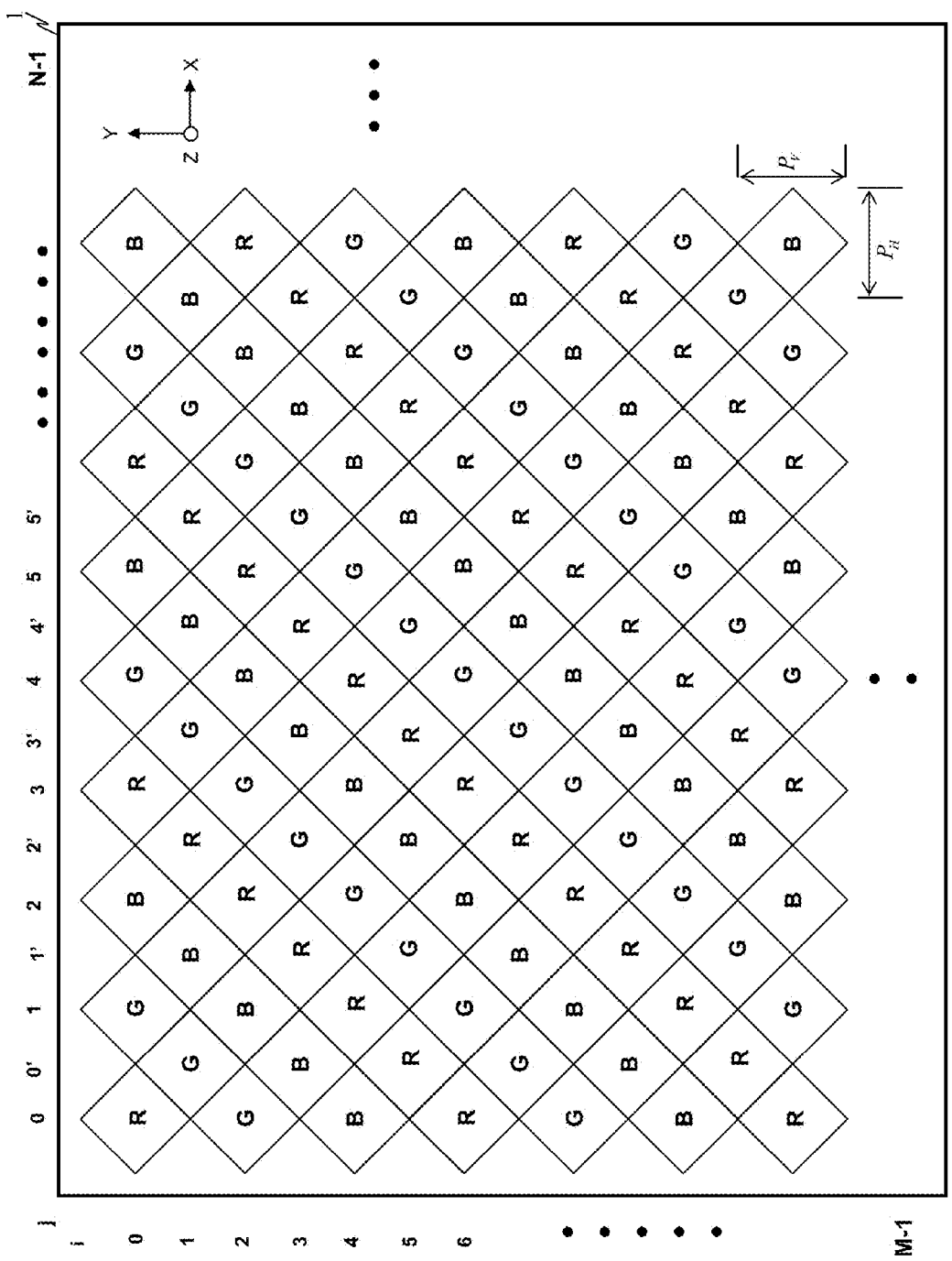
FIG. 23 and FIG. 24 are schematic diagrams showing a display screen with square-shaped configuration.
Figure 24:
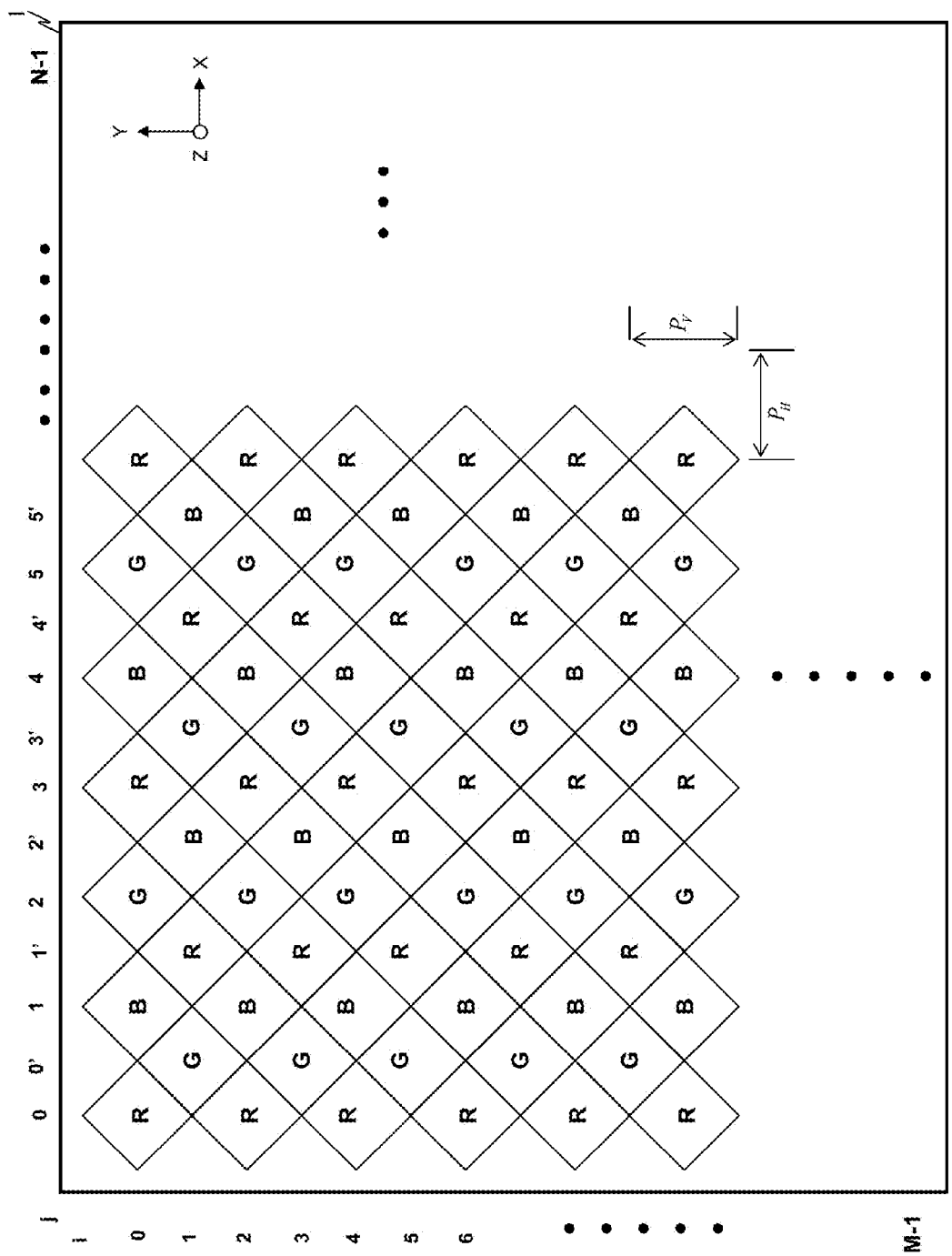

In the display screen with square-shaped configuration, there are existing two RGB sub-pixel arrangements, as illustrated in FIG. 23 and FIG. 24, which have the same RGB sub-pixel arrangement in the direction slanting to the right by an angle of 45 degrees as the arrangement in both the display screen with quadrilateral-shaped configuration and the display screen with triangle-shaped configuration, but different in the vertical direction and the direction slanting to the left by an angle of 45 degrees. That is, as shown in FIG. 23, the RGB sub-pixel arrangement of the display screen with square-shaped configuration is featured by a mono-color linear arrangement on the direction slanting to the left by a angle of 45-degree, whereas it is also true that there is also a mono-color linear arrangement on the vertical direction, as shown in FIG. 24. Thereby, the arrangement of FIG. 23 can be referred as a display screen with left-slanting square-shaped configuration, and the arrangement of FIG. 24 can be referred as a display screen with perpendicular square-shaped configuration.

Thus, the aforesaid sub-pixel structure and arrangement are the basic requirements to form an optimum dual-directional 3D display screen for achieving optimal 3D performance.

In addition, the display screen in this invention is composed of N×M sub-pixels, in which N represents the total number of sub-pixels in a horizontal direction (X axis) of the display screen, and M represents the total number of sub-pixels in a vertical direction (Y axis) of the display screen; in addition, the horizontal position and the vertical position of any single sub-pixel in N×M display screen are represented respectively using the index i and j, whereas $0 \le j \le N-1$ and $0 \le i \le M-1$; and each single sub-pixel has a size of $P_H \times P_V$, and $P_H = P_V$, whereas $P_H$ represents the horizontal width of a single sub-pixel and $P_V$ represents the vertical height of a single sub-pixel. Thereby, an image V displayed on a display screen can be represented as following:

$$V = \sum_{i=0}^{M-1} \sum_{j=0}^{N-1} V(i, j) \quad (1)$$

wherein, V(i, j) represents the sub-pixel image data at position (i, j) of the display screen.

Before further describing the achieving of a multi-view 3D combined image, it is required to have certain understanding about the relationship between the sub-pixel arrangement in a display screen and the locations in a memory where image data is registered.

In the display screen with quadrilateral-shaped configuration and the display screen with triangular-shaped configuration shown in FIG. 21 and FIG. 22, the image data V(i,j) is registered in a memory at a location (i, j), as those shown in FIG. 25. In the display screen with square-shaped configuration shown in FIG. 23 and FIG. 24, comparing to the even-numbered rows, the sub-pixels on the odd-numbered rows are shifted to the right by half of a pixel width, i.e. $P_H/2$. However, with respect to its registration in a memory, there is no such shifting problem, since for those image data V(i, j) where i=odd number and j=0', 1', 2', 3', 4', 5', etc., such image data image data V(i, j) can be treated as image data V(i, j) where i=odd number and j=0, 1, 2, 3, 4, 5, etc.

The following description and illustration relate to the application of a multi-view 3D image combination method used to produce a multi-view combined 3D image that are displayed on a display screen with quadrilateral-shaped configuration, a display screen with triangular-shaped configuration or a display screen with square-shaped configuration. A multiple views of image, referred as multi-view images hereinafter, consists of a plurality of single-view image $V_k$, whereas the single-view image can be defined as following:

$$V_k = \sum_{i=0}^{M-1} \sum_{j=0}^{N-1} V_k(i, j) \quad (2)$$

wherein, n is the total amount of view, k represents the index of view, and $0 \le k \le n$, $n \ge 2$; and $V_k(i, j)$ represents the sub-pixel image data of a single-view image $V_k$ at position (i, j) of the display screen.

According to the multi-view 3D image combination method disclosed in TW Pat. App. No. 101135830, a multi-view combined 3D image is generated according to the following formula:

$$\Sigma_n = \sum_{i=1}^{M-1} \sum_{j=0}^{N-1} V_\Lambda(i, j) \quad (3)$$

wherein, for the multi-view combined 3D images having a feature of slanting to the right, the index Λ is defined as:

$$\Lambda = \text{Mod}\left[\text{int}\left(\frac{j - \Pi \times \text{int}\left(\frac{i}{Q}\right) - \Delta}{m}\right), n\right] \quad (4)$$

for the multi-view combined 3D images having a feature of slanting to the left, the index Λ is defined as:

$$\Lambda = \text{Mod}\left[\text{int}\left(\frac{(N-1) - j - \Pi \times \text{int}\left(\frac{i}{Q}\right) - \Delta}{m}\right), n\right] \quad (5)$$

Similarly, the index i and j are respectively a horizontal position number and vertical position number of each sub-pixel, N represents the total number of sub-pixels in a horizontal direction of the display screen, and M represents the total number of sub-pixels in a vertical direction of the display screen, whereas $0 \le j \le N-1$ and $0 \le i \le M-1$; $V_\Lambda(i, j)$ represents the sub-pixel image data of a single-view image $V_\Lambda$ at position (i, j) of the display screen; Λ represents a view number, and $0 \le \Lambda < n$, while n is the total amount of view; m is a number of sub-pixels of a smallest view display unit in horizontal direction, while Q is a number of sub-pixels of a smallest view display unit in vertical direction, and thereby, mQ represents the smallest view display unit; Δ is a horizontal displacement phase; Π is a horizontal displacement amplitude, and int is a round down integer function, and Mod is a function of taking a remainder.

Figure 27:
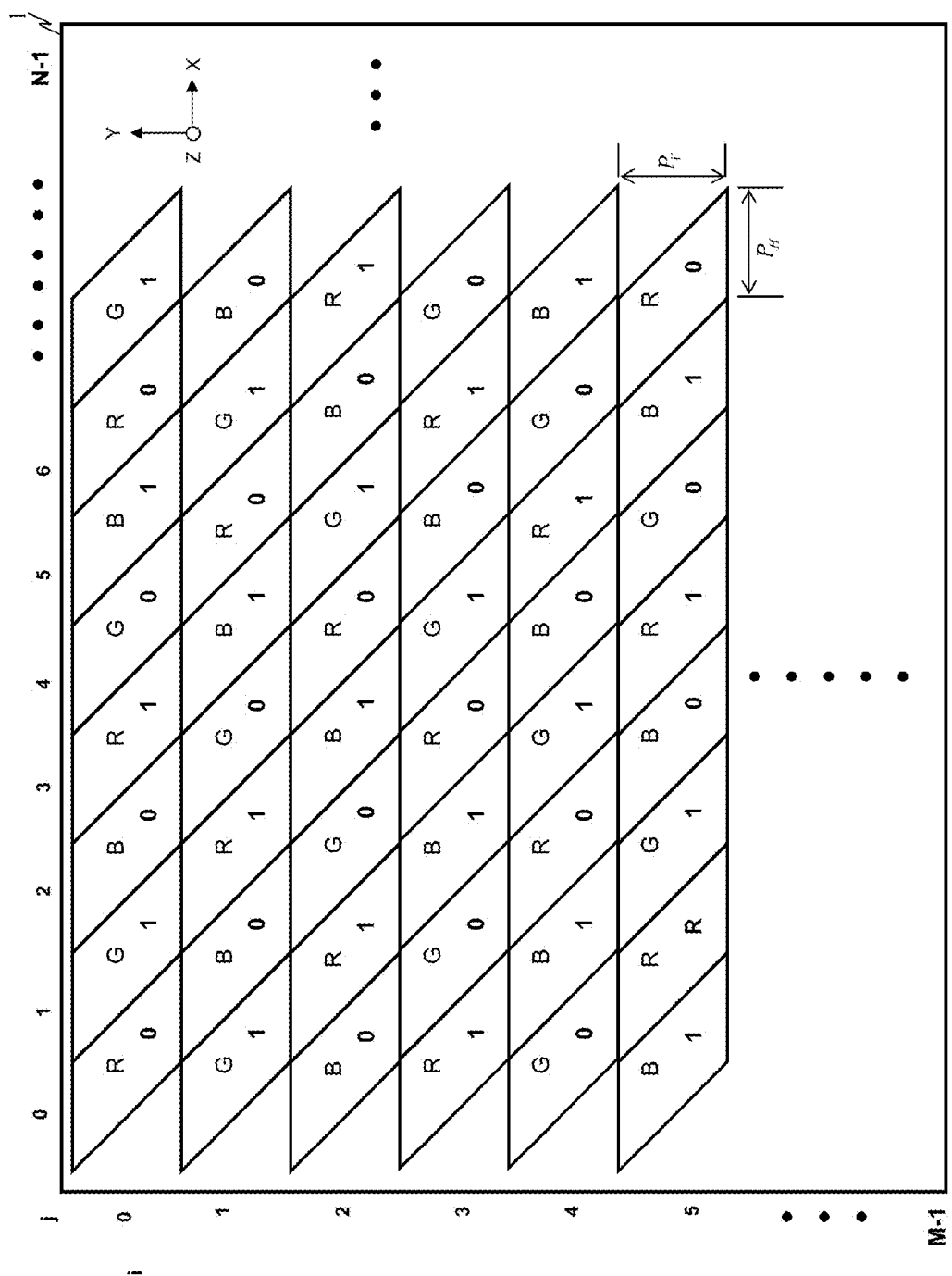
Figure 28:
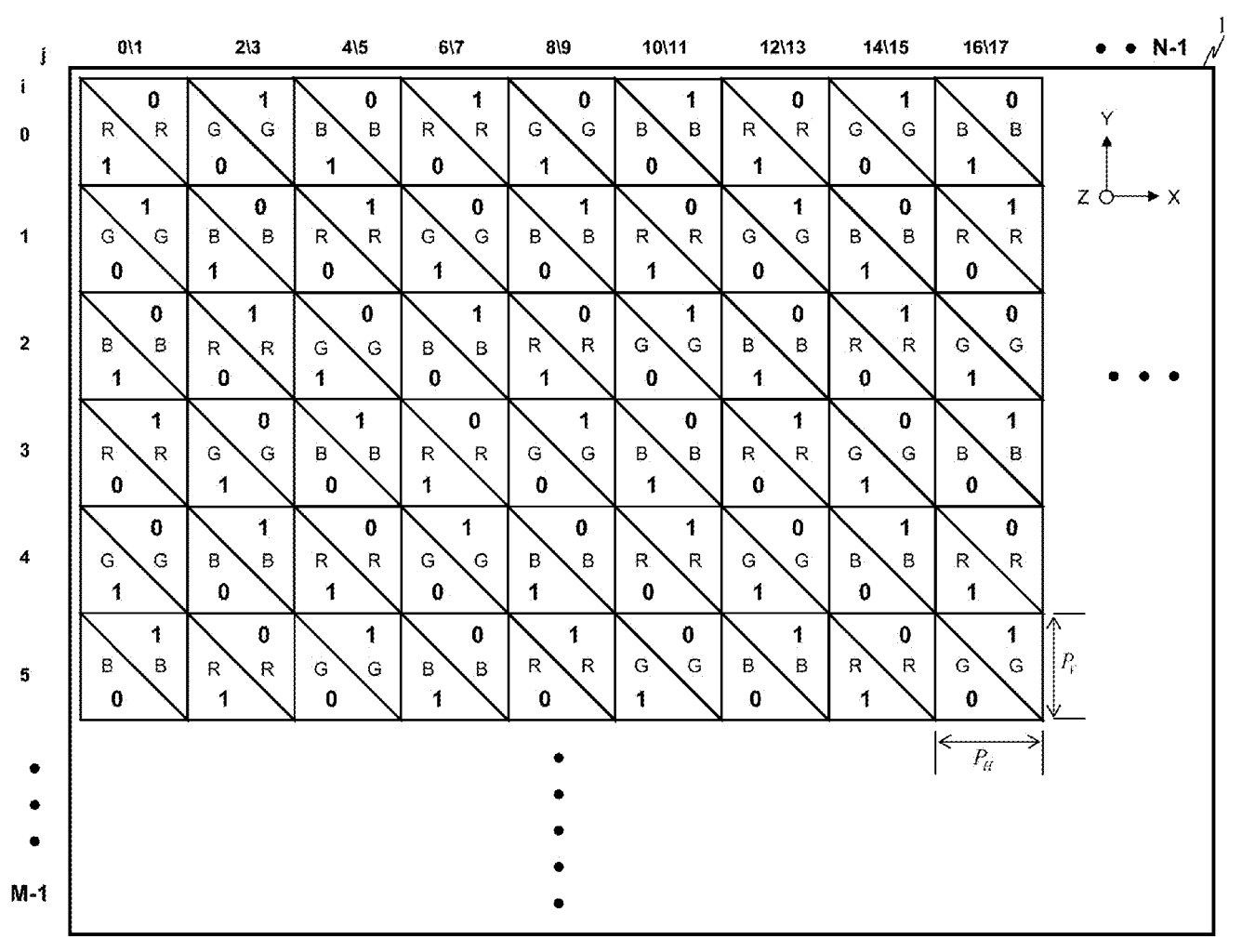
Figure 29:
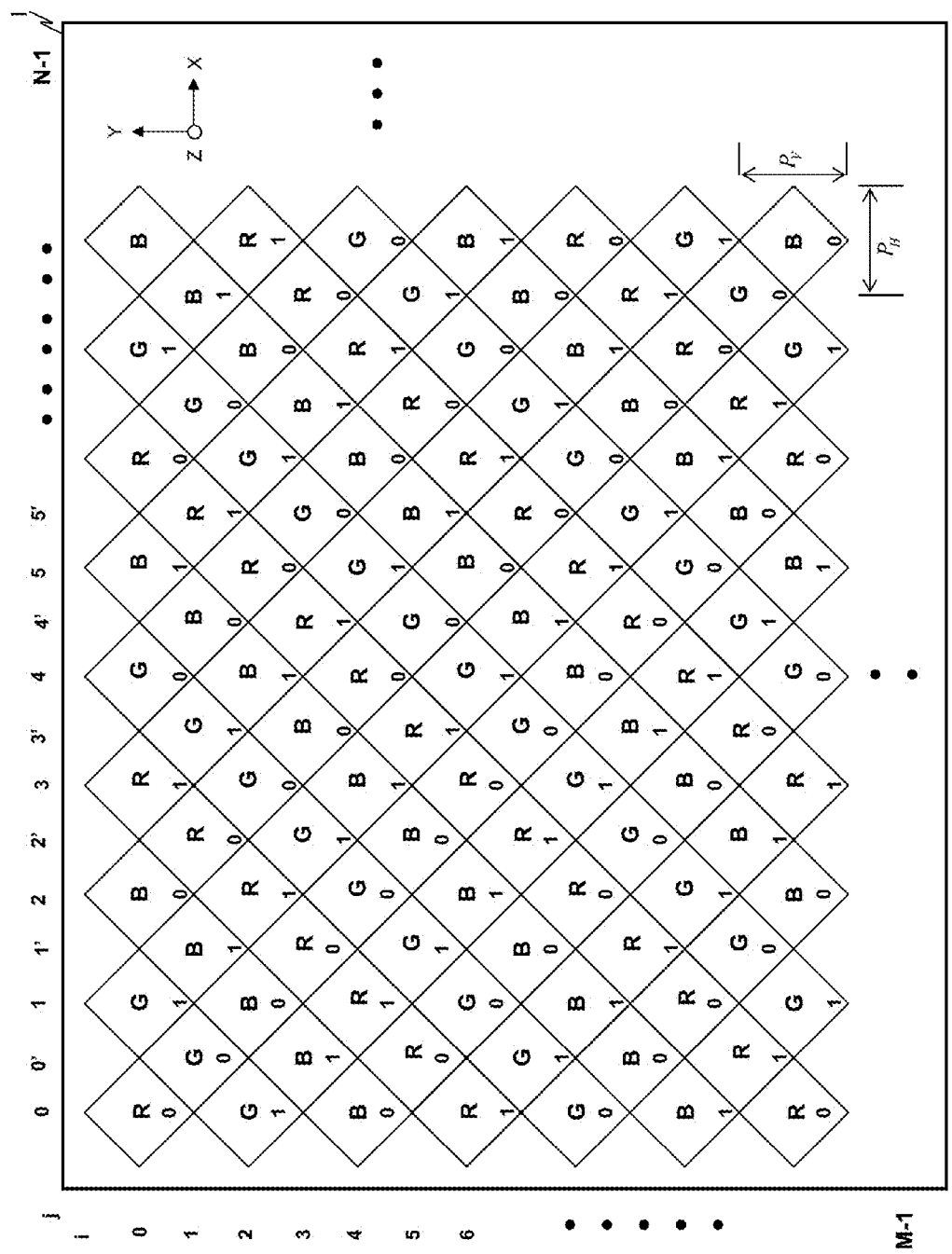
Figure 30:
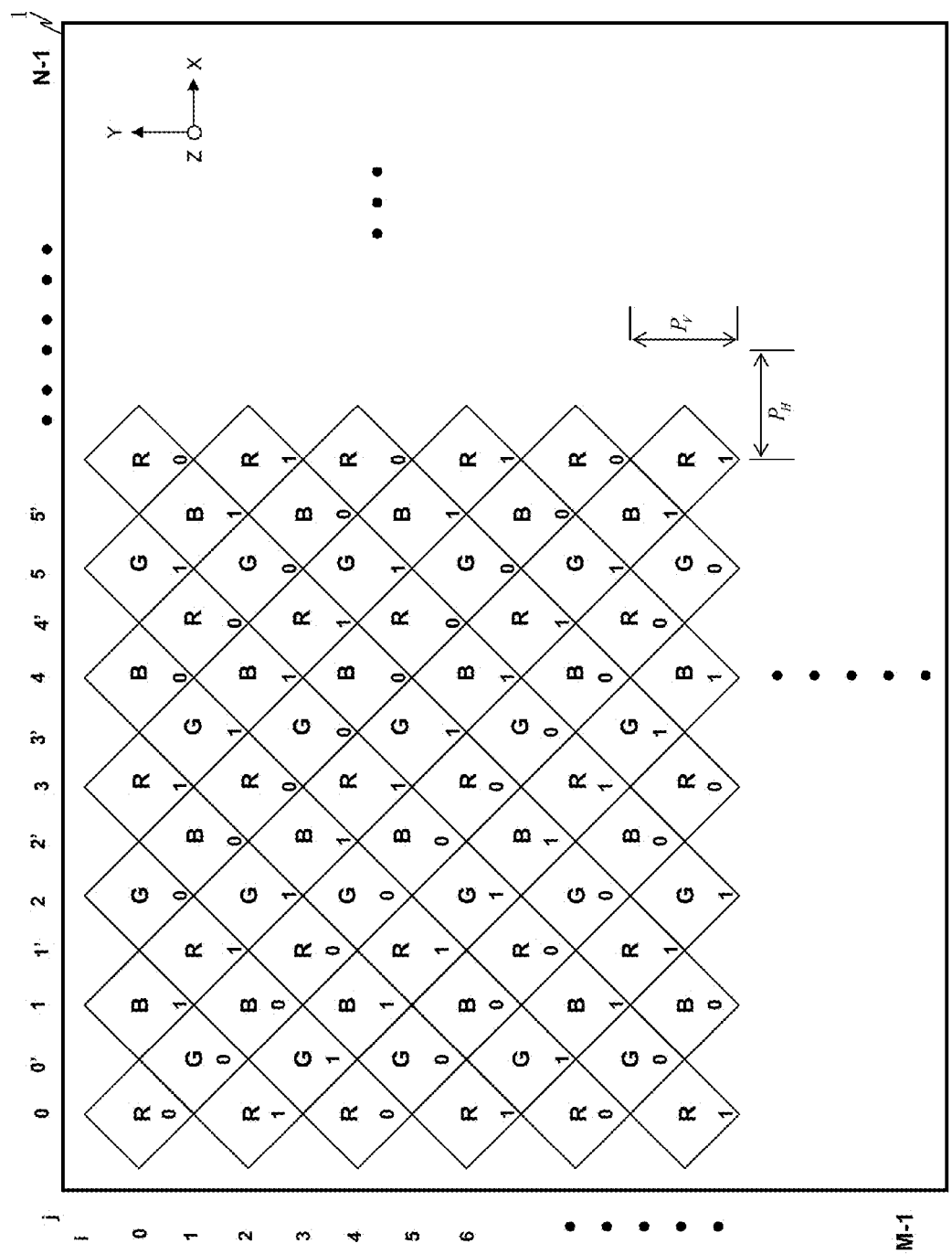

The following description of shortcomings is provided using a 2-view combined 3D image $\Sigma_n$ for example. Thereby, on a display screen with quadrilateral-shaped configuration shown in FIG. 27, the parameters are set as following: n=2, m=1, Q=1, Δ=0, and Π=1; for a display screen with triangular-shaped configuration shown in FIG. 28, the parameters are set as following: n=2, m=2, Q=1, Δ=1, and Π=2; and for a display screen with left-slanting square-shaped configuration and a display screen with perpendicular square-shaped screen shown in FIG. 29 and FIG. 30, the parameters are set as following: n=2, m=1, Q=2, Δ=0, and Π=1.

Nevertheless, for achieving multi-view 3D combined images, the parameters used in the formulas (4) and (5) can be set independently as following:

for a display screen with square-shaped configuration, the set of optimizatization parameters is:

$n \ge 2$, $m \ge 1$, $Q \ge 1$, $\Delta = 0$, $\Pi = 1$; \quad (6)

for a display screen with triangle-shaped configuration, the set of optimizatization parameters is:

$n \ge 2$, m equal to multiples of 2, $Q \ge 1$, $\Delta = 1$, $\Pi = 2$; \quad (7)

for a display screen with left-slanting square-shape configuration and a display screen with perpendicular square-shape configuration, the set of optimization parameters is:

$$n \geq 2, m \geq 1, Q=2, \Delta=0, \Pi=1. \quad (8)$$

Thereby, the parameters defined in the aforesaid formulas (6)~(8) are the optimal parameters for dual-directional 3D image displaying. Thus, the multi-view 3D combined image obtained using the aforesaid parameter settings can be referred as an optimal multi-view 3D combined image.

In addition, for preparing a multi-view 3D combined image to be displayed from a Landscape displaying mode into a Portrait displaying mode, or vice versa, the multi-view images should first be rotated by 90 degrees, and then to be combined using the formulas (4) and (5) to produce a multi-view combined 3D image.

The following description and illustration relate to the construction of a view separation device featured by a 45-degree slant angle, which includes a slantwise strip parallax barrier and a slantwise lenticular device.

Figure 31:
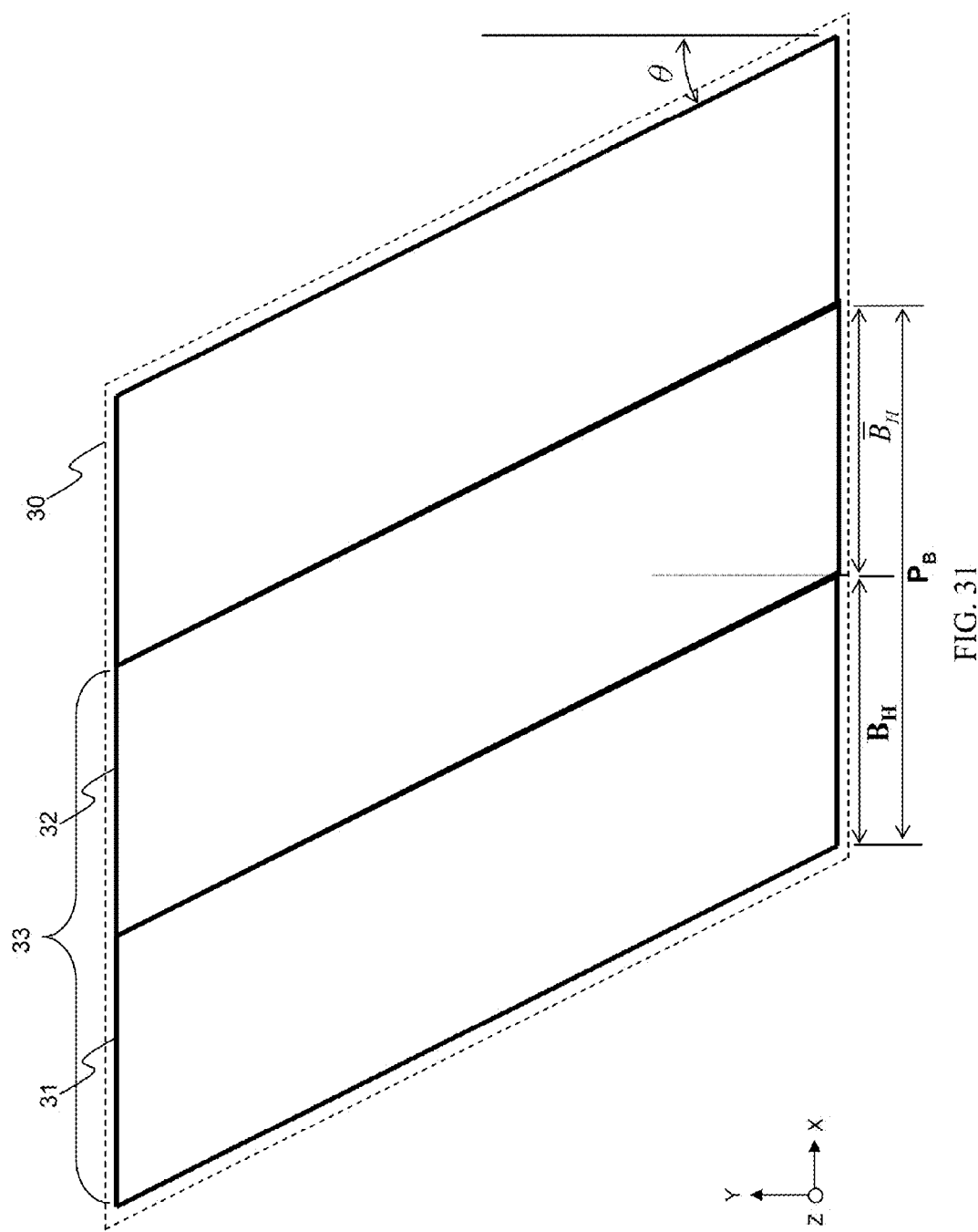
FIG. 31 is a schematic diagram showing a slantwise strip parallax barrier.

Please refer to FIG. 31, which is a schematic diagram showing a slantwise strip parallax barrier. As shown in FIG. 31, the slantwise strip parallax barrier 30 is composed of a plurality of slantwise strip transparent elements 31 and a plurality of slantwise strip shield elements 32, while defining one barrier unit 33 in the slantwise strip parallax barrier to be the composition of one transparent element 31 and one shield element 32, and there are a plurality of such barrier units 33 being arranged one next to another in a horizontal direction; and notably, each transparent element 31 is formed in a width $B_H$ and with a slant angle θ of 45 degrees, and each shield element 32 is formed in a width $\overline{B}_H$ and with a slant angle θ of 45 degrees, and thus, the horizontal width of one barrier unit 33 is $P_B = B_H + \overline{B}_H$, and with a slant angle θ of 45 degrees.

Figure 32:
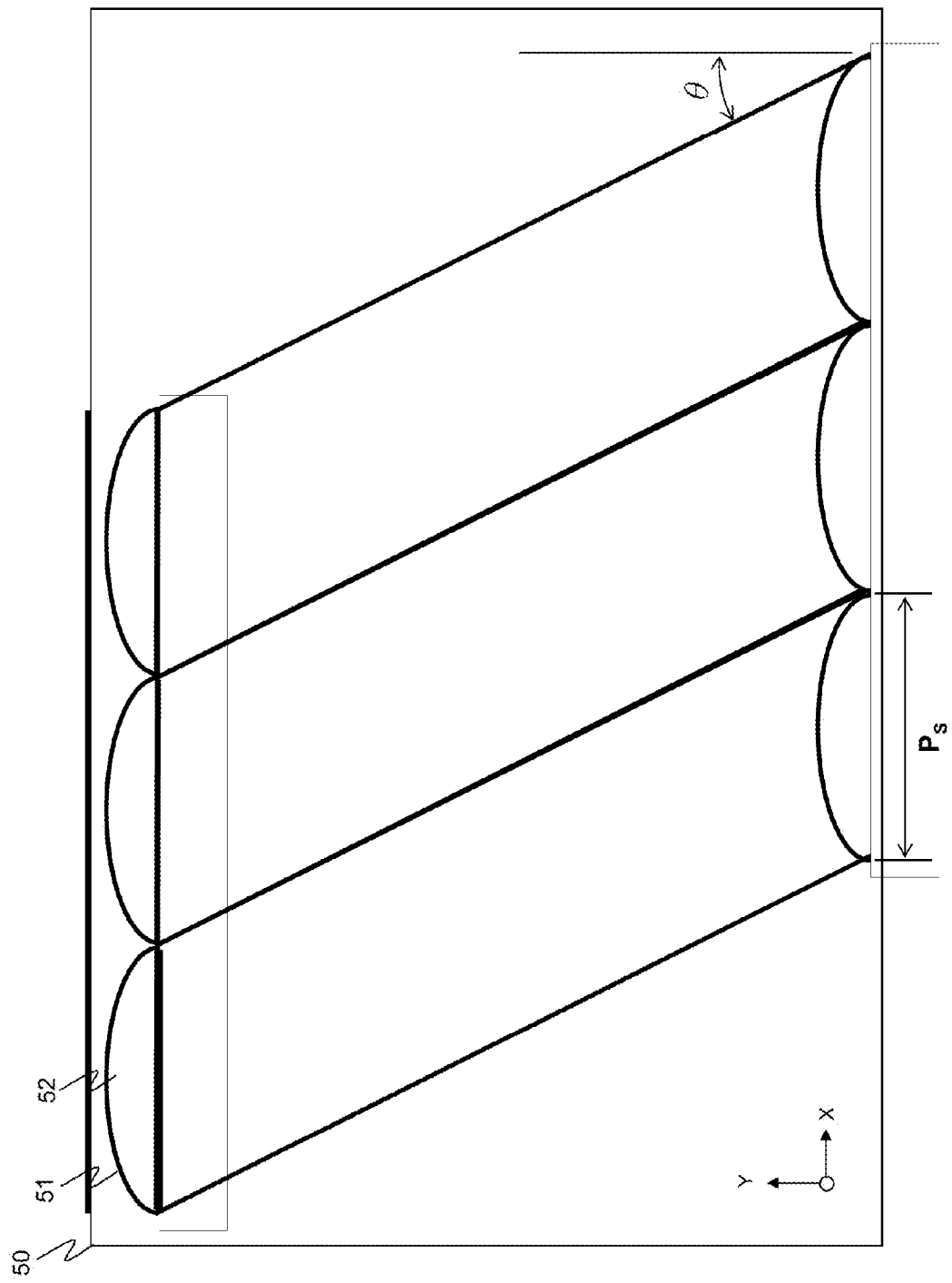
FIG. 32 is a schematic diagram showing a slantwise lenticular.
Figure 33:
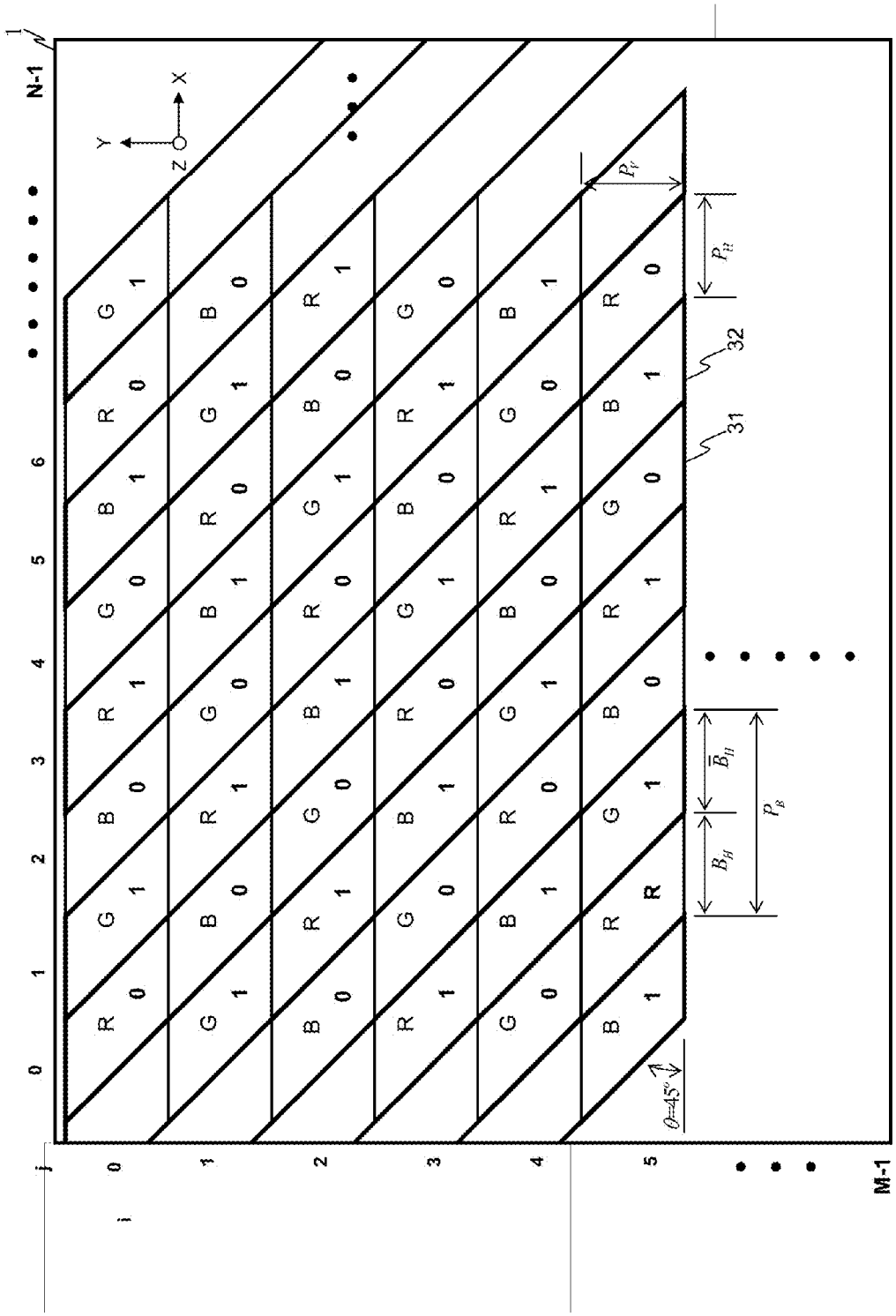
FIG. 33 to FIG. 36 are schematic diagrams showing a slantwise strip parallax barrier featured by a 45-degree slant angle.
Figure 34:
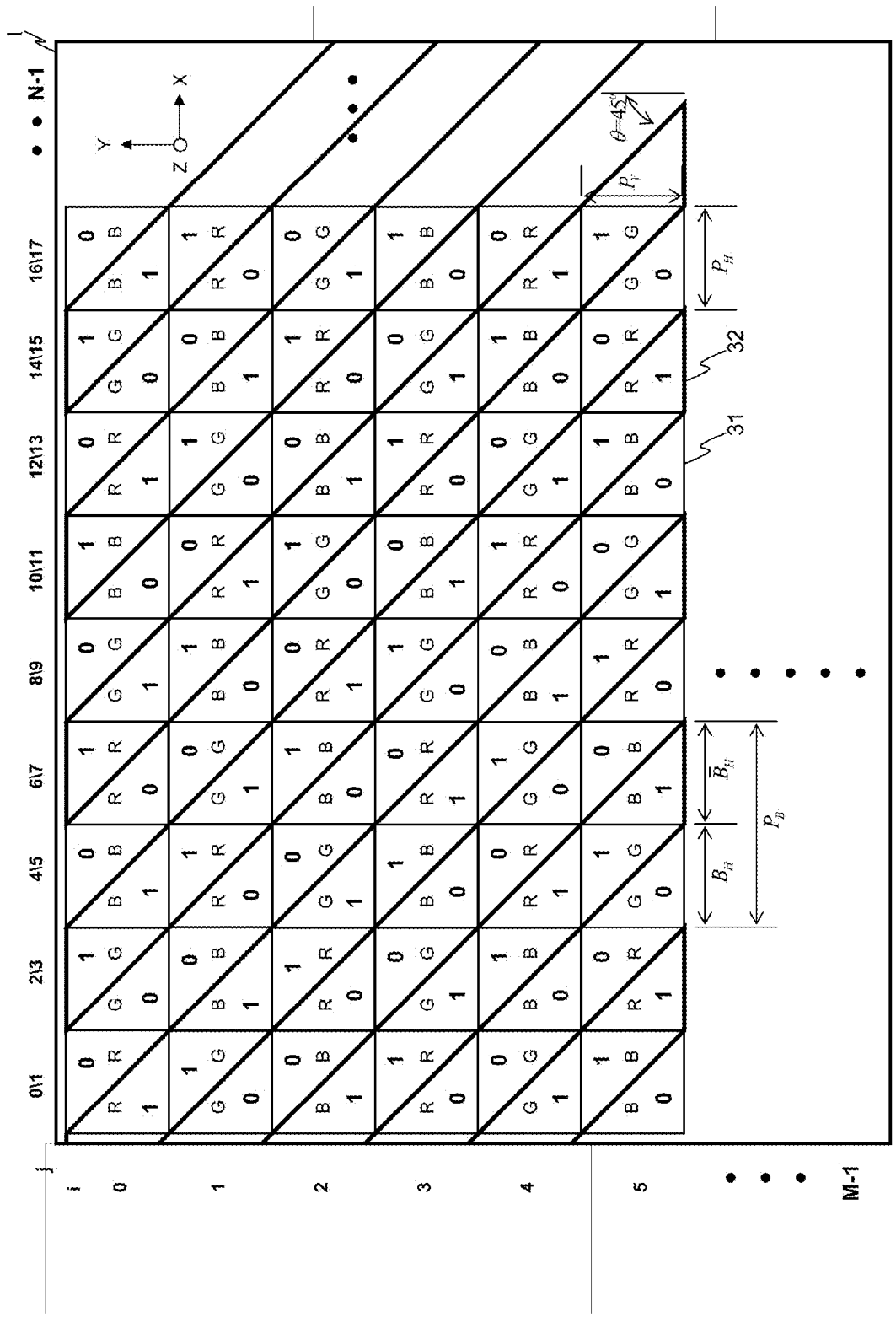
Figure 35:
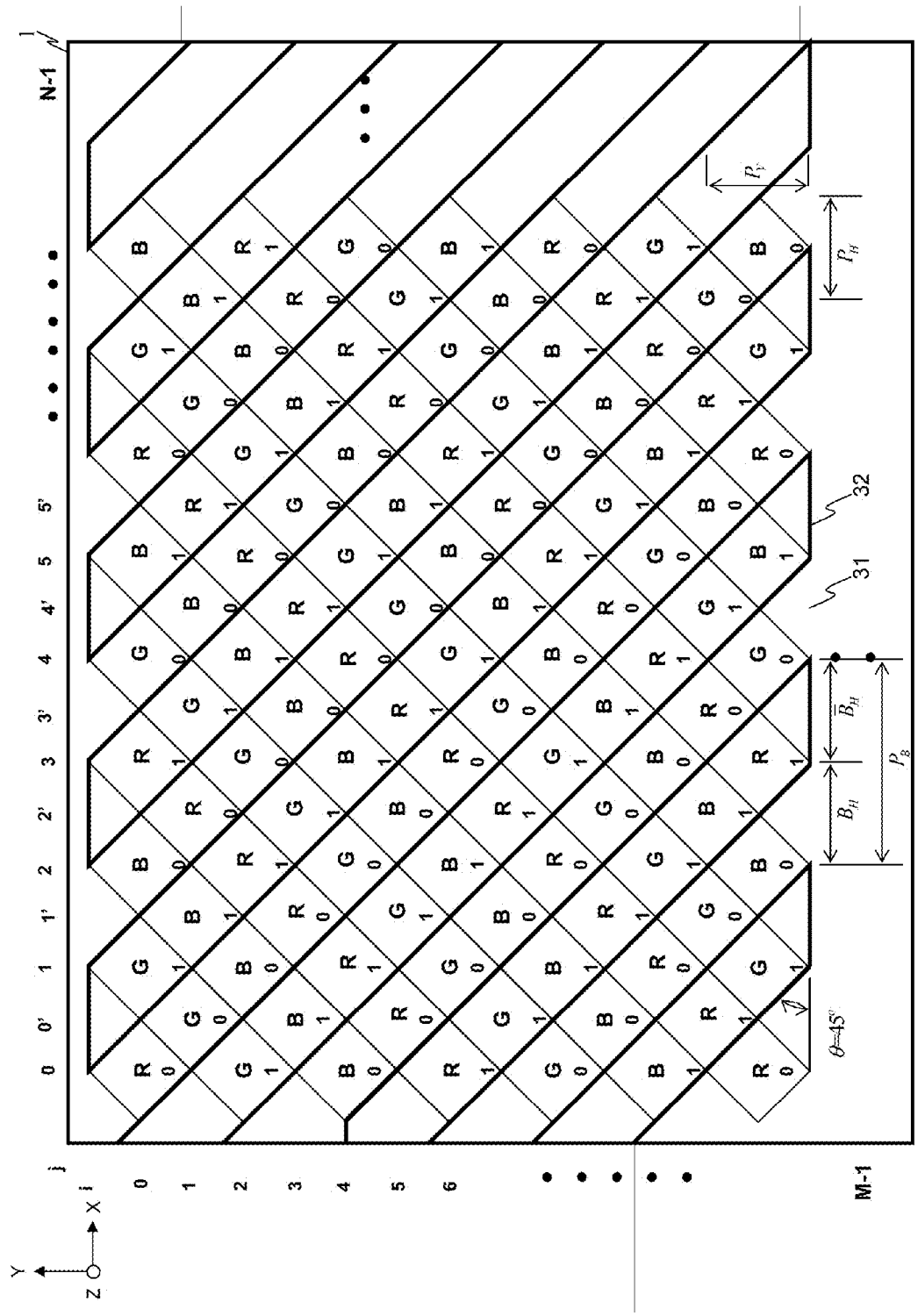
Figure 36:
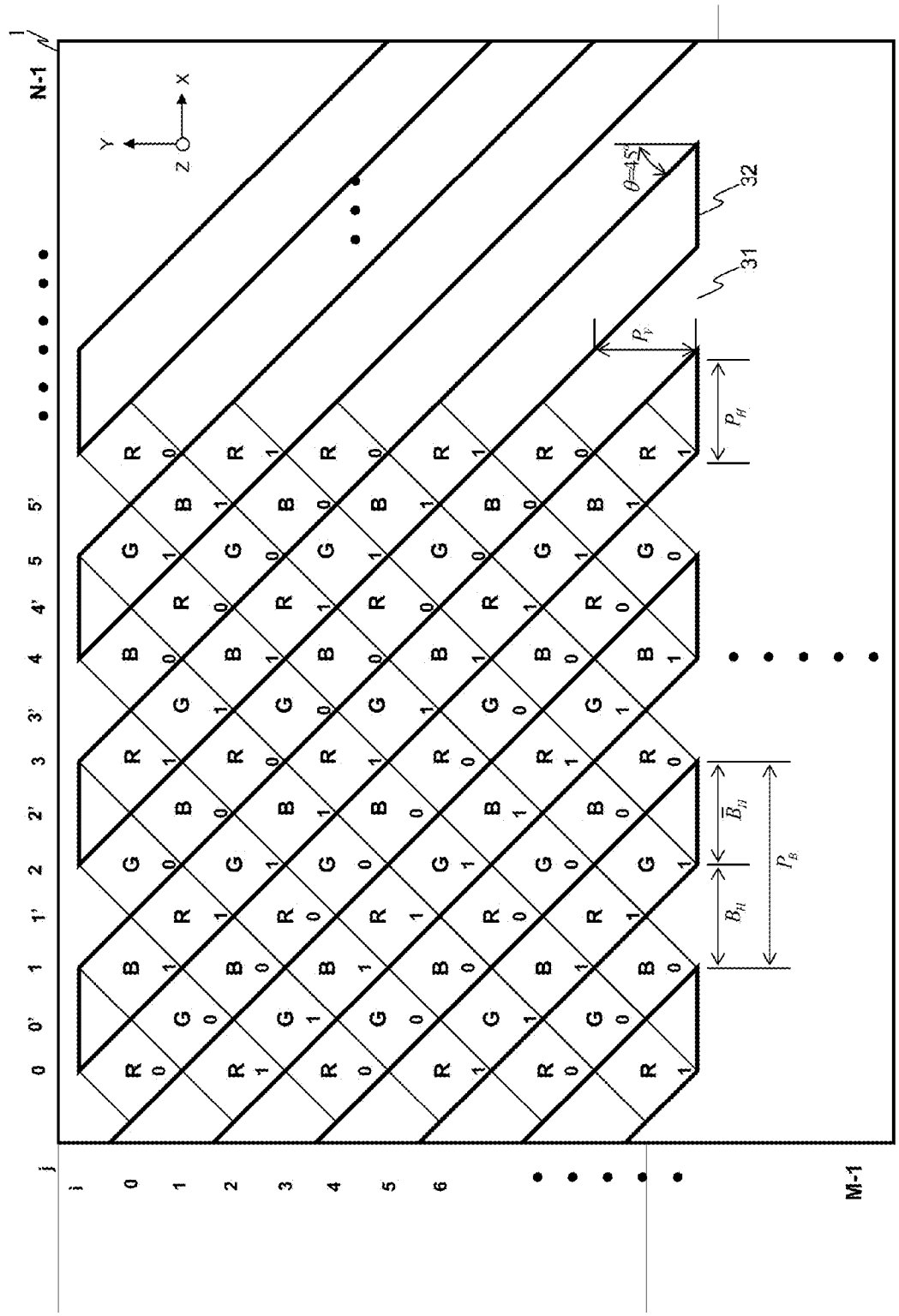

Please refer to FIG. 32, which is a schematic diagram showing a slantwise lenticular structure. As shown in FIG. 32, the slantwise lenticular 50 is composed of a plurality of cylindrical lenses 51, and each of the cylindrical lenses is formed with a focal length f, a sectional width $P_s$, a circular surface 52 and a slant angle of 45 degrees.

Each of the aforesaid slantwise parallax barrier 30 and slantwise lenticular 50 is provided to be used as the required view separation device featured by a 45-degree slant angle for enabling 3D image displaying.

In the TW Pat. App. No. 101135830, a view separation device structure design method is disclosed, which can be adapted for the aforesaid optimal display screen for display optimal multi-view 3D combined images. Substantially, the optimal multi-view 3D combined image obtained by the use of the aforesaid formulas (4)~(8) is fed to a view separation device featured by a 45-degree slant angle for enabling a dual-directional equivalent view separation effect, so as to achieve the dual-directional 3D image displaying. It is noted that the view separation device featured by a 45-degree slant angle includes a slantwise strip parallax barrier and a slantwise lenticular which are optimized using the formulas provided in the TW Pat. App. No. 101135830.

Thus, the slantwise strip parallax barrier featured by a 45-degree slant angle is constructed using the following formulas:

$$\tan\theta = 1 \quad (9)$$

$$B_H = \frac{D_H L_H}{D_H + L_H} = \frac{Z_0 - L_B}{Z_0} D_H \quad (10)$$

$$\overline{B}_H = (n-1)B_H \quad (11)$$

$$L_H = \frac{D_H B_H}{D_H - B_H} = \frac{Z_0}{L_B} B_H \quad (12)$$

$$Z_0 = \frac{D_H}{D_H - B_H} L_B \quad (13)$$

$$D_H = mP_H \quad (14)$$

$$L_V = L_H \quad (15)$$

and the slantwise lenticular featured by a 45-degree slant angle is constructed using the following formulas:

$$\tan\theta = 1 \quad (16)$$

$$P_s = n\frac{D_H L_H}{D_H + L_H} = \frac{Z_0 - f}{Z_0} nD_H \quad (17)$$

$$L_H = \frac{Z_0}{nf} P_s \quad (18)$$

$$Z_0 = \frac{D_H}{D_H - \frac{P_S}{n}} f \quad (19)$$

$$D_H = mP_H \quad (20)$$

$$L_V = L_H \quad (21)$$

Wherein, n is the total amount of view; $Z_0$ is the optimum viewing distance; $L_B$ is defined to be a device distance; $L_H$ is the optimum horizontal interval between two neighboring optimum viewing points, and $L_V$ is the optimum vertical interval between two neighboring optimum viewing points; $D_H$ is the width of a smallest view display unit in horizontal direction; $P_H$ is a horizontal width of a sub-pixel; and m is a number of sub-pixels of a smallest view display unit in horizontal direction, while being a number defined by the aforesaid formulas (6) to (8), but for a display screen with triangular-shaped configuration, the value of m defined by the formula (7) should be divided by 2. In addition, the slantwise strip parallax barrier is enabled to perform in equivalent optics behavior with the slantwise lenticular featured by a 45-degree slant angle using the following conditions:

$$f=L_B \quad (22)$$

$$P_s=P_B \quad (23)$$

To sum up, the present invention relates to a dual-directional 3D image displaying method, being used in a case when a flat-panel display screen and a view separation device are used for dual-directional 3D image displaying, which comprises the steps of: using a display screen having a sub-pixel arrangement of 45-degree slant angle to display a multi-view 3D combined image; and using a view separation device featured by a 45-degree slant angle to perform a view separation operation upon the multi-view 3D combined image. Thereby, an object of dual-directional displaying of 3D images can be achieved using only one view separation device, without being bothered by conventional problems, such as cross-talk and color distortion.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A dual-directional 3D image displaying method, being used in a case when a flat-panel display screen and a view separation device are used for dual-directional 3D image displaying, comprising the steps of:
using a display screen having a sub-pixel arrangement of 45-degree slant angle to display a multi-view 3D combined image; and
using a view separation device featured by a 45-degree slant angle to perform a view separation operation upon the multi-view 3D combined image,
wherein the multi-view 3D combined image of 45-degree slant angle is established using the following formulas:

$$\Sigma_n = \sum_{i=0}^{M-1} \sum_{j=0}^{N-1} V_\Lambda(i, j), \text{ and}$$

$$\Lambda = \text{Mod}\left[\text{int}\left(\frac{j - \Pi \times \text{int}\left(\frac{i}{Q}\right) - \Delta}{m}\right), n\right],$$

$$\Lambda = \text{Mod}\left[\text{int}\left(\frac{(N-1) - j - \Pi \times \text{int}\left(\frac{i}{Q}\right) - \Delta}{m}\right), n\right],$$

the display screen is composed of N×M sub-pixels, in which N represents the total number of sub-pixels in a horizontal direction of the display screen, and M represents the total number of sub-pixels in a vertical direction of the display screen; in addition, the horizontal position and the vertical position of any single sub-pixel in N×M display screen are represented respectively using the index i and j, whereas $0 \leq j \leq N-1$ and $0 \leq i \leq M-1$; and moreover, $V_\Lambda(i, j)$ represents the sub-pixel data of a single-view image $V_\Lambda$ at position (i, j) of the display screen; $\Lambda$ represents a view number, and $0 \leq \Lambda < n$, while n is the total amount of view; m is a positive integer representing a number of sub-pixels of a smallest view display unit in horizontal direction, while Q is a positive integer representing a number of sub-pixels of a smallest view display unit in vertical direction; $\Delta$ is an integer representing a horizontal displacement phase; $\Pi$ is an integer representing a horizontal displacement amplitude; and int is a round down integer function, and Mod is a function of taking a remainder;
n, m, Q, $\Delta$ and $\Pi$ are determined according to a set of optimization parameters wherein:
for a display screen with square-shaped configuration, the set of optimization parameters is:

$n \geq 2$, $m \geq 1$, $Q \geq 1$, $\Delta = 0$, $\Pi = 1$;

for a display screen with triangle-shaped configuration, the set of optimization parameters is:

$n \geq 2$, m equal to multiplies of 2, $Q \geq 1$, $\Delta = 1$, $\Pi = 2$;

for a display screen with left-slanting square-shape configuration and a display screen with perpendicular square-shape configuration, the set of optimization parameters is:

$n \geq 2$, $m \geq 1$, $Q = 2$, $\Delta = 0$, $\Pi = 1$.

2. The dual-directional 3D image displaying method of claim 1, wherein in the display screen with quadrilateral-shaped configuration, the sub-pixels are arranged in a [R, G, B] ordering from left to right on the horizontal direction, and in a [R, G, B] ordering from top to bottom on the vertical direction, and in a [R, B, G], [G, R, B], [B, G, R] ordering from top to bottom following a direction slanting to the right by the angle of 45-degree, while enabling no mono-color linear arrangement to be constructed in the RGB arrangement of the sub-pixels in any of the vertical direction, the horizontal direction and the direction slanting to the right by the angle of 45-degree.

3. The dual-directional 3D image displaying method of claim 1, wherein the display screen with square-shape configuration is composed of a display screen with left-slanting square-shape configuration and a display screen with perpendicular square-shape configuration.

4. The dual-directional 3D image displaying method of claim 1, wherein the view separation device featured by a 45-degree slant angle is composed of a slantwise strip parallax barrier featured by a 45-degree slant angle and a slantwise lenticular featured by a 45-degree slant angle.

5. The dual-directional 3D image displaying method of claim 4, wherein the slantwise strip parallax barrier featured by a 45-degree slant angle is composed of a plurality of slantwise strip transparent elements and a plurality of slantwise strip shield elements, while defining one barrier unit in the slantwise strip parallax barrier to be the composition of one transparent element and one shield element, and there are a plurality of such barrier units being arranged one next to another in a horizontal direction; and notably, each transparent element is formed in a width $B_H$ and with a slant angle $\theta$ of 45 degrees, and each shield element is formed in a width $\overline{B}_H$ and with a slant angle $\theta$ of 45 degrees, and thus, the horizontal width of one barrier unit is $P_B = B_H + \overline{B}_H$, and with a slant angle $\theta$ of 45 degrees; in addition, the slantwise strip parallax barrier featured by a 45-degree slant angle is constructed using the following formulas:

$$\tan\theta = 1,$$

$$B_H = \frac{D_H L_H}{D_H + L_H} = \frac{Z_0 - L_B}{Z_0} D_H,$$

$$\overline{B}_H = (n-1)B_H,$$

$$L_H = \frac{D_H B_H}{D_H - B_H} = \frac{Z_0}{L_B} B_H,$$

$$Z_0 = \frac{D_H}{D_H - B_H} L_B,$$

$$D_H = mP_H,$$

$$L_V = L_H,$$

and, n is the total amount of view; $Z_0$ is the optimum viewing distance; $L_B$ is defined to be a device distance; $L_H$ is the optimum horizontal interval between two neighboring optimum viewing points, and $L_V$ is the optimum vertical interval between two neighboring optimum viewing points; $D_H$ is the width of a smallest view display unit in horizontal direction; $P_H$ is a horizontal width of a sub-pixel; and m is a number of sub-pixels of a smallest view display unit in horizontal direction, in and n are determined according to a set of optimization parameters, where for a display screen with square-shaped configuration, the set of optimization parameters is:

n≥2, m≥1, for a display screen with triangle-shaped configuration, the set of optimization parameters is:

n≥2, and m is a whole number, and for a display screen with left-slanting square-shape configuration and a display screen with perpendicular square-shape configuration, the set of optimization parameters is:

n≥2, m≥1.

6. The dual-directional 3D image displaying method of claim 4, wherein the slantwise lenticular featured by a 45-degree slant angle is composed of a plurality of cylindrical lenses, and each of the cylindrical lenses is formed with a focal length f, a sectional width $P_s$, and a slant angle of 45 degrees; and the slantwise lenticular featured by a 45-degree slant angle is constructed using the following formulas:

$$\tan\theta = 1,$$

$$P_s = n\frac{D_H L_H}{D_H + L_H} = \frac{Z_0 - f}{Z_0} nD_H,$$

$$L_H = \frac{Z_0}{nf} P_s,$$

$$Z_0 = \frac{D_H}{D_H - \frac{P_s}{n}} f,$$

$$D_H = mP_H,$$

$$L_V = L_H,$$

and, n is the total amount of view; $Z_0$ is the optimum viewing distance; $L_H$ is the optimum horizontal interval between two neighboring optimum viewing points, and $L_V$ is the optimum vertical interval between two neighboring optimum viewing points; $D_H$ is the width of a smallest view display unit in horizontal direction; $P_H$ is a horizontal width of a sub-pixel; and in is a number of sub-pixels of a smallest view display unit in horizontal direction, m and n are determined according to a set of optimization parameters, wherein for a display screen with square-shaped configuration, the set of optimization parameters is:

n≥2, m≥1, for a display screen with triangle-shaped configuration, the set of optimization parameters is:

n≥2, and m is a whole number, and for a display screen with left-slanting square-shape configuration and a display screen with perpendicular square-shape configuration, the set of optimization parameters is:

n≥2, m≥1.

7. The dual-directional 3D image displaying method of claim 1, wherein the display screen having a sub-pixel arrangement of 45-degree slant angle is composed of N×M sub-pixels, in which N represents the total number of sub-pixels in a horizontal direction of the display screen, and M represents the total number of sub-pixels in a vertical direction of the display screen; and each single sub-pixel has a size of PH×PV, and PH=PV, whereas PH represents the horizontal width of a single sub-pixel and PV represents the vertical height of a single sub-pixel; in addition, each sub-pixel is enabled to display a color selected from the group consisting of: red (R), green (G), blue (B) and white (W), and is formed in a shape selected from the group consisting of: a parallelogram having 45-degree internal angle, an isosceles right triangle, and a square, while enabling each sub-pixel to allow an intersection angle of 45 degree to be formed between at least one side of each sub-pixel and the horizontal direction of the display screen; and thereby, the display screen that is formed according to the arrangement of the RGB sub-pixels is a screen selected from the group consisting of: a display screen with quadrilateral-shaped configuration, a display screen with triangle-shaped configuration and a display screen with square-shaped configuration.

8. The dual-directional 3D image displaying method of claim 7, wherein in the display screen with triangle-shaped configuration, a sub-pixel unit is formed of two horizontally neighboring sub-pixels with the same color; and the sub-pixel unit are arranged in a [R, G, B] ordering from left to right on the horizontal direction, and in a [R, G, B] ordering from top to bottom on the vertical direction, and in a [R, B, G], [G, R, B], [B, G, R] ordering from top to bottom following a direction slanting to the right by the angle of 45-degree, while enabling no mono-color linear arrangement to be constructed in the RGB arrangement of the sub-pixel unit in any of the vertical direction, the horizontal direction and the direction slanting to the right by the angle of 45-degree.

* * * * *